US012323931B2

(12) United States Patent
Akl et al.

(10) Patent No.: US 12,323,931 B2
(45) Date of Patent: Jun. 3, 2025

(54) REPORTING A SYNCHRONIZATION SIGNAL BLOCK CONFIGURATION TO A CONTROL UNIT

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 208 days.

(21) Appl. No.: 17/360,811

(22) Filed: Jun. 28, 2021

(65) Prior Publication Data
US 2022/0061002 A1 Feb. 24, 2022

Related U.S. Application Data

(60) Provisional application No. 62/706,483, filed on Aug. 19, 2020.

(51) Int. Cl.
*H04W 56/00* (2009.01)
*H04W 24/10* (2009.01)
*H04W 72/0446* (2023.01)
*H04W 72/541* (2023.01)

(52) U.S. Cl.
CPC .......... *H04W 56/001* (2013.01); *H04W 24/10* (2013.01); *H04W 72/0446* (2013.01); *H04W 72/541* (2023.01)

(58) Field of Classification Search
CPC ........... H04W 24/10; H04W 48/00–08; H04W 72/541
See application file for complete search history.

(56) References Cited

U.S. PATENT DOCUMENTS 12,250,651 B2 * 3/2025 Lindqvist .............. H04W 56/00
2019/0035003 A1 * 1/2019 Jang .................... G06Q 30/0639
2019/0350003 A1 11/2019 Jang et al.
(Continued)

FOREIGN PATENT DOCUMENTS

WO WO-2020063243 A1 4/2020
WO WO-2020092348 A1 5/2020

OTHER PUBLICATIONS

On MIB Support in F1-AP, November 27-Dec. 1, 2017, Intel Corporation, 3GPP TSG RAN WG3 Meeting #98 (Year: 2017).*
(Continued)

*Primary Examiner* — Michael Thier
*Assistant Examiner* — Prince A Mensah
(74) *Attorney, Agent, or Firm* — Harrity & Harrity, LLP

(57) ABSTRACT

Various aspects of the present disclosure generally relate to wireless communication. In some aspects, a base station distributed unit (DU) may configure a report that identifies a transmission timing within a radio frame for transmission of one or more cell-defining synchronization signal blocks (CD-SSBs) in a serving cell of the base station DU. The base station DU may transmit the report to a base station control unit. Numerous other aspects are provided.

30 Claims, 12 Drawing Sheets

(56) References Cited

U.S. PATENT DOCUMENTS

| | | | | |
|---|---|---|---|---|
| 2019/0363810 | A1* | 11/2019 | Luo | H04B 17/336 |
| 2021/0058879 | A1* | 2/2021 | Geng | H04L 5/0048 |
| 2021/0212007 | A1* | 7/2021 | Liu | H04W 56/0015 |
| 2021/0337491 | A1* | 10/2021 | Xu | G01S 19/256 |
| 2022/0210754 | A1* | 6/2022 | Harada | H04W 24/10 |
| 2022/0303924 | A1* | 9/2022 | Dahlman | H04L 5/0032 |
| 2023/0029702 | A1* | 2/2023 | Harada | H04W 56/001 |
| 2023/0059563 | A1* | 2/2023 | Harada | H04L 27/2675 |
| 2023/0119744 | A1* | 4/2023 | Lin | H04L 5/001 370/329 |

OTHER PUBLICATIONS

Huawei: "Resource Coordination Between Multi-Hop BH Links," 3GPP Draft, 3GPP TSG-RAN WG3 Meeting #105bis, R3-195462, Resource Coordination Between Multi-Hop BH Links, 3rd Generation Partnership Project (3GPP), Mobile Competence Centre, 650, Route Des Lucioles, F-06921, Sophia-Antipolis Cedex, France, vol. RAN WG3, No. Chongqing, China, Oct. 14, 2019-Oct. 18, 2019, Oct. 5, 2019 (Oct. 5, 2019), XP051810297, 4 pages, Retrieved from the Internet: URL: https://ftp.3gpp.org/tsg_ran/WG3_lu/TSGR3_105bis/Docs/R3-195462.zip R3-195462 Resource coordination between multi-hop BH links.doc [retrieved on Oct. 5, 2019] Section 2.

Huawei: "Resource Coordination Between Multi-Hop BH Links," 3GPP Draft, 3GPP TSG-RAN WG3 Meeting #106, R3-196991, 3rd Generation Partnership Project (3GPP), Mobile Competence Centre, 650, Route Des Lucioles, F-06921, Sophia-Antipolis Cedex, France, vol. RAN WG3. No. Reno. NV. USA, Nov. 18, 2019-Nov. 22, 2019, Nov. 8, 2019 (Nov. 8, 2019), XP051820650, 25 Pages, Retrieved from the Internet: URL: https://ftp.3gpp.org/tsg_ran/WG3_lu/TSGR3_106/Docs/R3-196991.zip R3-196991- Resource coordination between multi-hop BH links.doc [retrieved on Nov. 8, 2019] Section 1, 2 and 8.2.4, p. 5 figures 8.2.4.2-1.

Intel Corporation: "On MIB Support in F1-AP," 3GPP Draft, 3GPP TSG RAN WG3 Meeting #98, R3-174626-F1-MIB-V1, 3rd Generation Partnership Project (3GPP), Mobile Competence Centre, 650, Route Des Lucioles, F-06921, Sophia-Antipolis Cedex, France, vol. RAN WG3. No. Reno. Nevada, US, Prague, Nov. 27, 2017-Dec. 1, 2017, Nov. 17, 2017 (Nov. 17, 2017), 4 pages, XP051373201, Retrieved from the Internet: URL: http://www.3gpp.org/ftp/tsg%5Fran/WG3%5Flu/TSGR3%5F98/Docs/ [retrieved on Nov. 17, 2017] Section 2.

International Search Report and Written Opinion—PCT/US2021/039564—ISA/EPO—Nov. 12, 2021.

Nokia, et al., "Clarification to MeasurementTimingConfiguration," 3GPP Draft, 3GPP TSG-RAN WG2 Meeting #105, R2-1900350 Clarification to Measurementtimingconfiguration, 3rd Generation Partnership Project (3GPP), Mobile Competence Centre, 650, Route Des Lucioles, F-06921, Sophia-Antipolis Cedex, France, vol. RAN WG2. No. Athens, Greece, Feb. 15, 2018-Mar. 1, 2018, Feb. 14, 2019 (Feb. 14, 2019), XP051601747, 3 pages, Retrieved from the Internet: URL: http://www.3gpp.org/ftp/tsg%5Fran/WG2%5FRL2/TSGR2%5F105/Docs/R2%2D1900350%2Ezip [retrieved on Feb. 14, 2019] Section 11.2.2.

\* cited by examiner

REPORTING A SYNCHRONIZATION SIGNAL BLOCK CONFIGURATION TO A CONTROL UNIT

CROSS-REFERENCE TO RELATED APPLICATION

This Patent Application claims priority to U.S. Provisional Patent Application No. 62/706,483, filed on Aug. 19, 2020, entitled "REPORTING A SYNCHRONIZATION SIGNAL BLOCK CONFIGURATION TO A CONTROL UNIT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reporting a synchronization signal block (SSB) configuration to a control unit.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station distributed unit (DU) includes configuring a report that identifies a transmission timing within a radio frame for transmission of one or more cell-defining synchronization signal blocks (CD-SSBs) in a serving cell of the base station DU; and transmitting the report to a base station control unit (CU).

In some aspects, a method of wireless communication performed by a base station CU includes receiving a report from a base station DU; and identifying, based at least in part on the report, a transmission timing within a radio frame for transmission of one or more CD-SSBs in a serving cell of the base station DU.

In some aspects, a base station DU for wireless communication includes a memory and one or more processors coupled to the memory, the memory and the one or more processors configured to: configure a report that identifies a transmission timing within a radio frame for transmission of one or more CD-SSBs in a serving cell of the base station DU; and transmit the report to a base station CU.

In some aspects, a base station CU for wireless communication includes a memory and one or more processors coupled to the memory, the memory and the one or more processors configured to: receive a report from a base station DU; and identify, based at least in part on the report, a transmission timing within a radio frame for transmission of one or more CD-SSBs in a serving cell of the base station DU.

In some aspects, a non-transitory computer-readable medium storing a set of instructions for wireless communication includes one or more instructions that, when executed by one or more processors of a base station DU, cause the base station DU to: configure a report that identifies a transmission timing within a radio frame for transmission of one or more CD-SSBs in a serving cell of the base station DU; and transmit the report to a base station CU.

In some aspects, a non-transitory computer-readable medium storing a set of instructions for wireless communication includes one or more instructions that, when executed by one or more processors of a base station CU, cause the base station CU to: receive a report from a base station DU; and identify, based at least in part on the report, a transmission timing within a radio frame for transmission of one or more CD-SSBs in a serving cell of the base station DU.

In some aspects, an apparatus for wireless communication includes: means for configuring a report that identifies a transmission timing within a radio frame for transmission of one or more CD-SSBs in a serving cell of the apparatus; and means for transmitting the report to a base station CU.

In some aspects, an apparatus for wireless communication includes: means for receiving a report from a base station DU; and means for identifying, based at least in part on the report, a transmission timing within a radio frame for transmission of one or more CD-SSBs in a serving cell of the base station DU.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
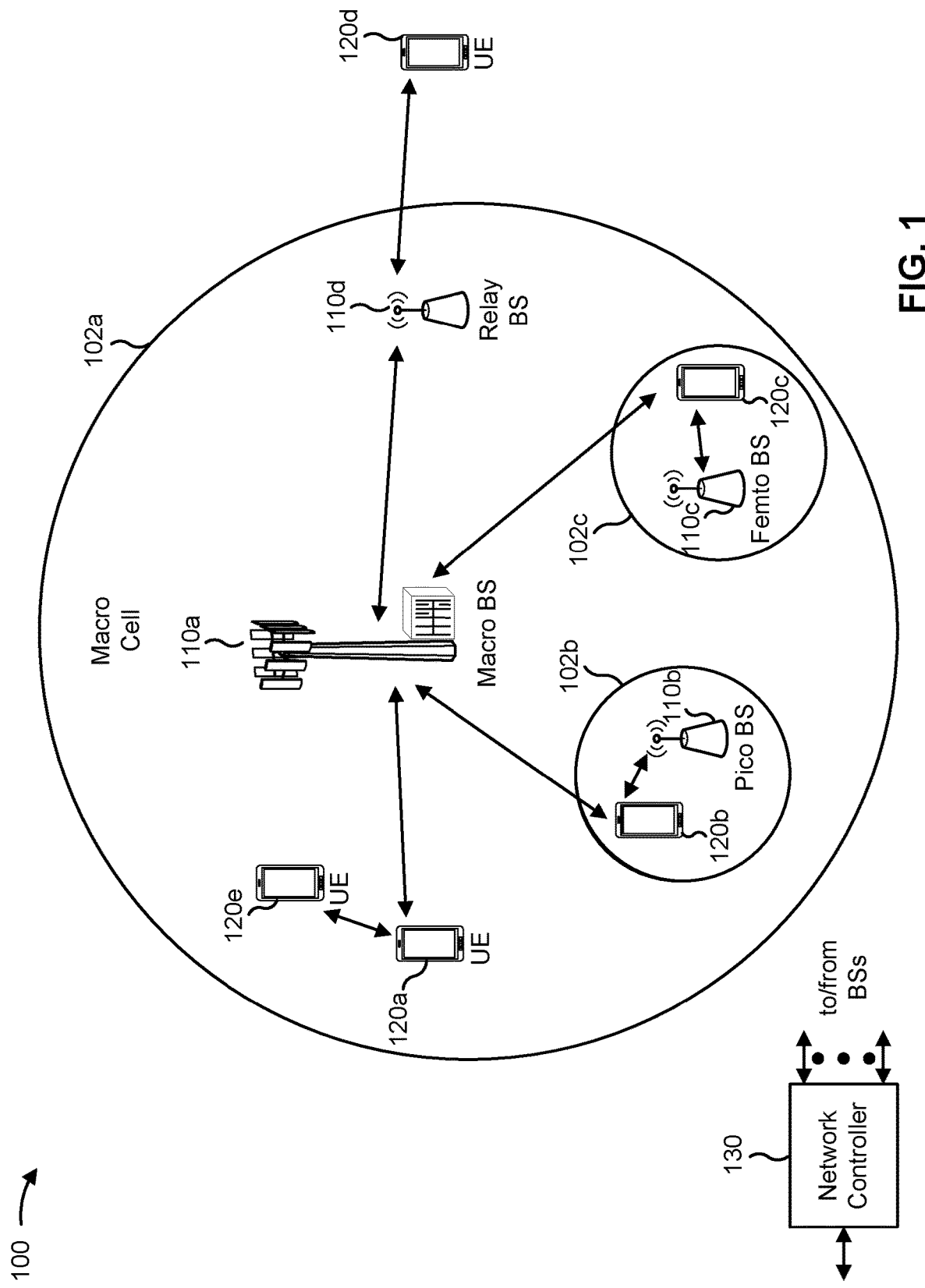
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE 120 may detect synchronization signal blocks (SSBs) transmitted from one or more cells (e.g., neighbor cells to the serving cell of the UE 120 and/or other cells) in the wireless network 100. A UE 120 may detect SSBs from cells in the wireless network 100 during an SSB measurement timing configuration (SMTC) window. A base station 110 may provide, to the UE 120, an SMTC configuration that specifies the SMTC window (e.g., the time-domain resources, the duration and location of the time-domain resources, and/or the like) in which to detect and measure SSBs from the cells. The UE 120 may provide measurement results for the SSBs to the serving cell. The UE 120 and/or the serving cell may use the measurement resource for various purposes such as cell re-selection and handover decision making.

As indicated above, FIG. 1 is provided as an example. Other examples may differ from what is described with regard to FIG. 1.

Figure 2:
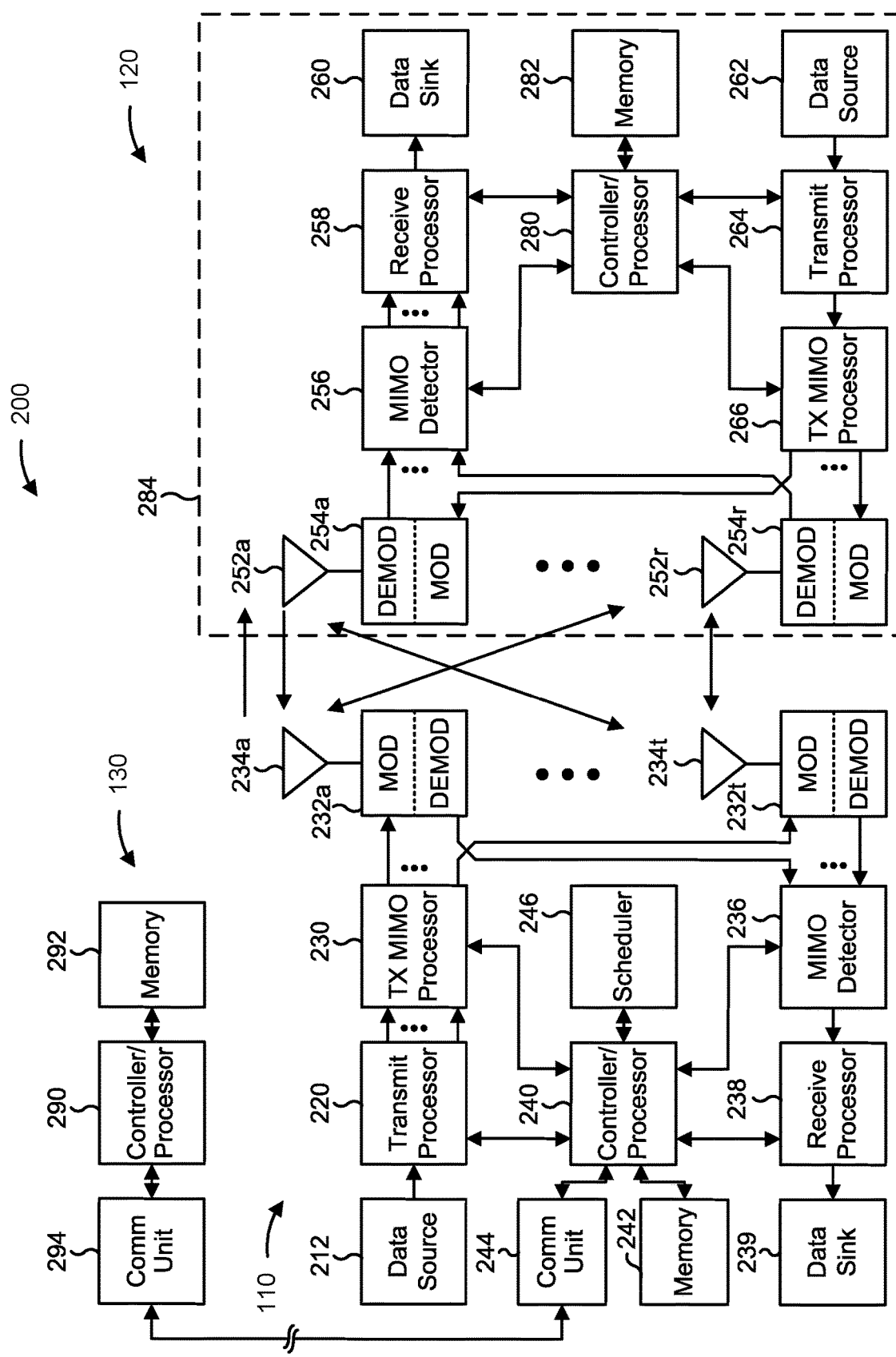
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-9).

Controller/processor 240 of base station 110, controller/processor 280 of UE 120, and/or any other component(s) of FIG. 2 may perform one or more techniques associated with reporting a synchronization signal block (SSB) configuration to a control unit, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a base station 110 may include means for configuring a report that identifies a transmission timing within a radio frame for transmission of one or more cell-defining synchronization signal blocks (CD-SSBs) in a serving cell of the base station 110, means for transmitting the report to a base station control unit (CU), and/or the like. In some aspects, a base station 110 may include means for receiving a report from a base station distributed unit (DU), means for identifying, based at least in part on the report, a transmission timing within a radio frame for transmission of one or more CD-SSBs in a serving cell of the base station DU, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
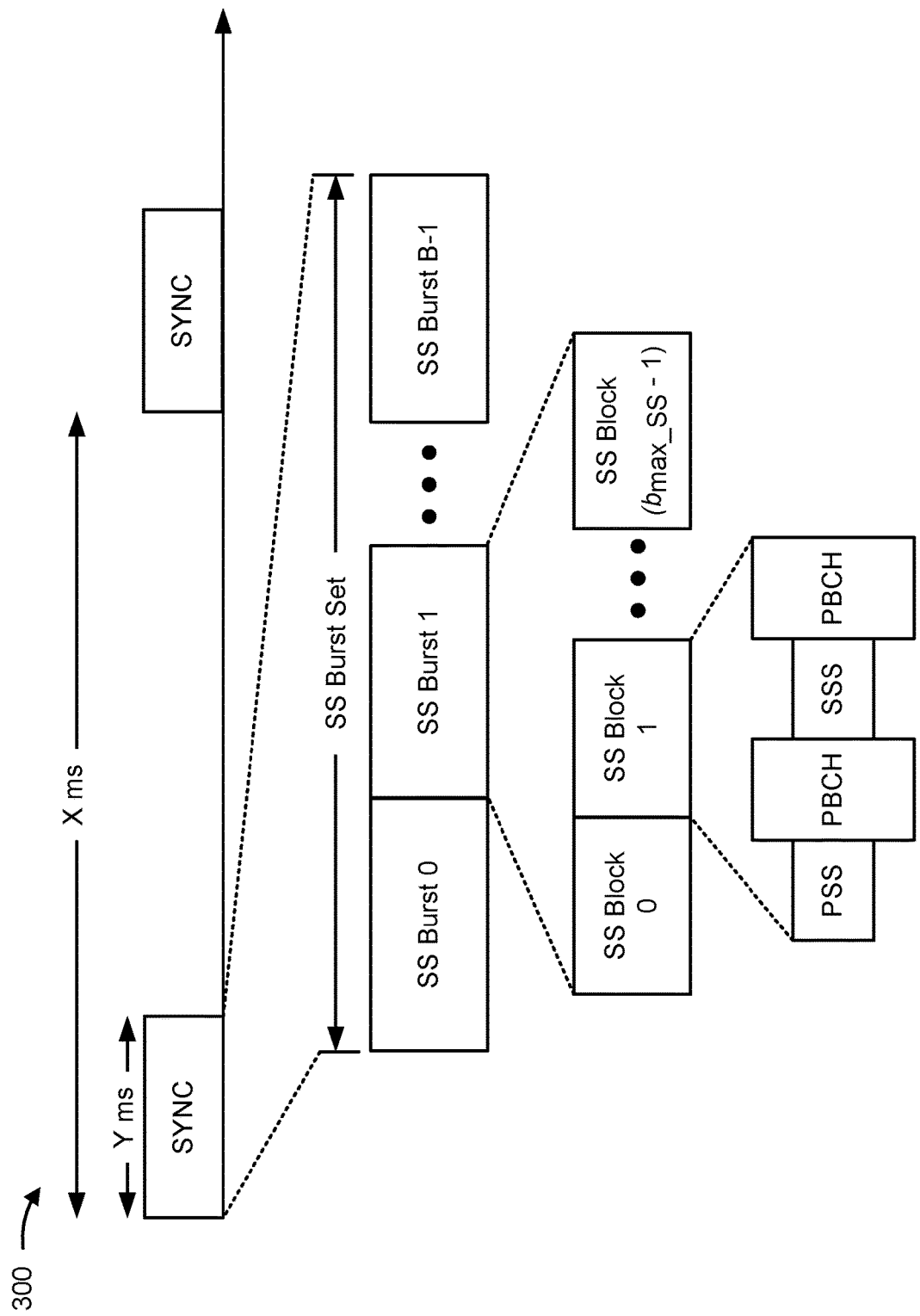
FIG. 3A is a block diagram illustrating an example synchronization communication hierarchy in a wireless communication network, in accordance with the present disclosure.

FIG. 3A is a block diagram conceptually illustrating an example synchronization signal hierarchy, which is an example of a synchronization communication hierarchy. As shown in FIG. 3A, the synchronization signal hierarchy may include an synchronization signal (SS) burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3A. In some aspects, an SS burst set may have a fixed or dynamic length, shown as Y milliseconds in FIG. 3A.

Figure 3B:
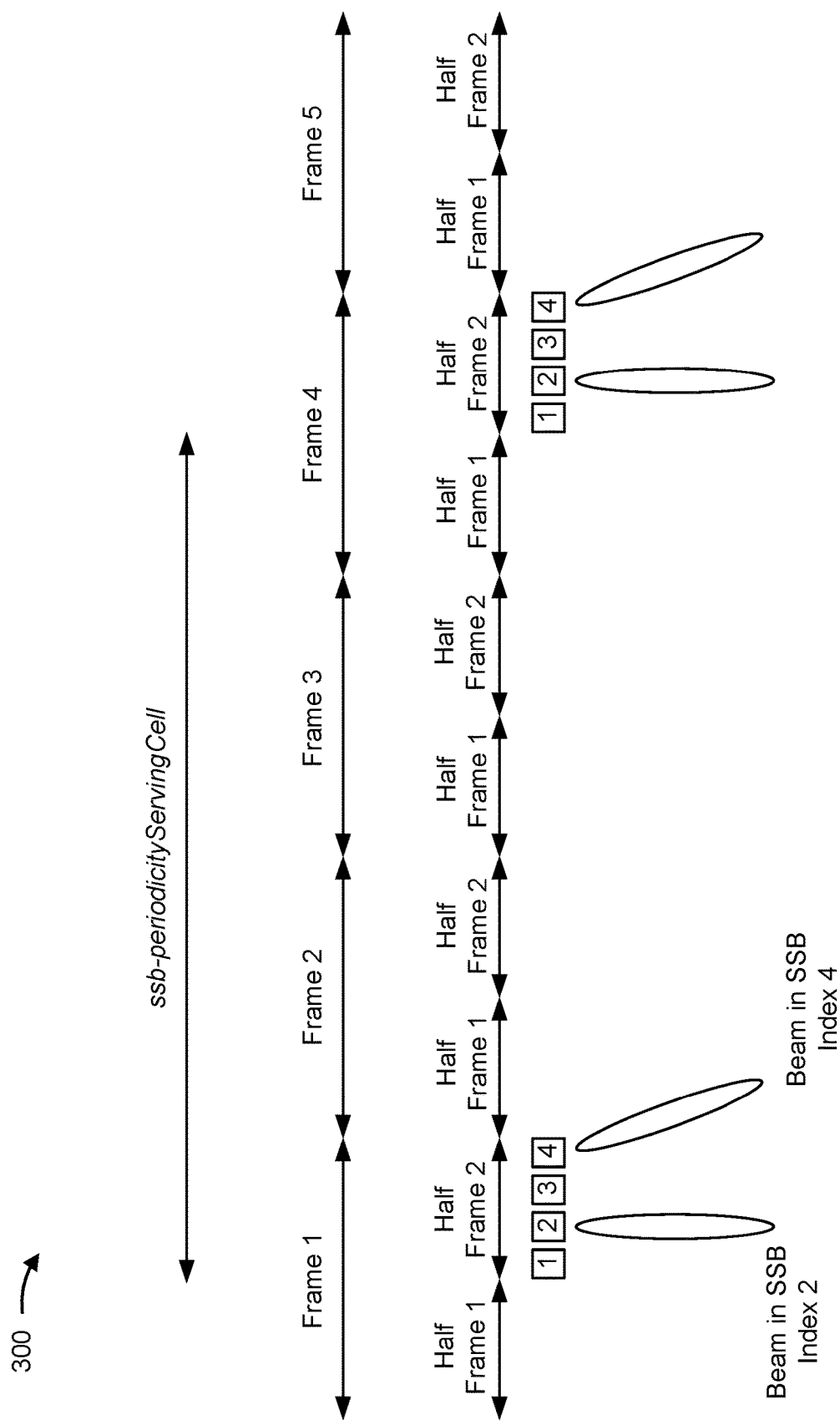
FIG. 3B is a block diagram illustrating an example transmission timing for transmission of one or more cell-defining synchronization signal blocks (CD-SSBs), in accordance with the present disclosure.

The SS burst set shown in FIG. 3A is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3A. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set. In some aspects, the base station may transmit a cell defining synchronization signal block (CD-SSB) burst based at least in part on a transmission timing, as described below in connection with FIG. 3B.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

FIG. 3B is a block diagram conceptually illustrating an example transmission timing for transmission of one or more CD-SSBs, in accordance with the present disclosure. "CD-SSB" may refer to an SSB that is associated with and/or encodes a cell identifier (e.g., a physical cell identifier (PCI), an NR cell global identity (NCGI), or another type of cell identifier) of an individual serving cell of a base station, and is therefore cell-defining for the serving cell. CD-SSBs may be transmitted for various purposes, such as discovery of the serving cell for random access, for cell re-selection and handover decision making, and/or the like.

As shown in FIG. 3B, CD-SSBs may be transmitted by a base station at a particular periodicity (e.g., every 5 milliseconds (ms), every 20 ms, or another periodicity), which may be defined in and/or indicated by an SSB periodicity serving cell information element (ssb-periodicityServingCell). The base station may transmit the SSB periodicity serving cell information element to other base stations and/or UEs as part of system information (e.g., SIB 1) transmitted by the base station.

Each CD-SSB transmission period may span one or more radio frames (e.g., which may include a time duration of 10 ms or another time duration) and/or one or more half radio frames (e.g., which may include a time duration of 5 ms or another time duration). As an example, and as illustrated in FIG. 3B, the base station may transmit one or more CD-SSBs the beginning of CD-SSB transmission period in a half fame (e.g., half frame 2 of frame 1), may transmit one or more CD-SSBs at the beginning of the next CD-SSB transmission period (e.g., in half frame 2 of frame 4), and so on.

Within a half frame, the base station may transmit a CD-SSB in one or more SSB occasions. Each SSB occasion may be associated with an index (e.g., SSB index 1 through SSB index 4, up to 64 SSB indexes, and/or the like). As an example, the base station may transmit a CD-SSB in the SSB occasion associated with SSB index 2 in half frame 2 of frame 1, and may transmit another CD-SSB in another SSB occasion associated with SSB index 4 in half frame 2 of frame 1. The base station may transmit the CD-SSBs in a similar manner in half frame 2 of frame 4, and so on.

The SSB occasions in which the base station is to transmit a CD-SSB in a CD-SSB transmission period may be indicated by a bitmap in an information element (e.g., ssb-PositionsInBurst). The base station may transmit the information element to other base stations and/or UEs as part of system information (e.g., SIB 1) or radio resource control (RRC) signaling. Each bit in the bitmap may correspond to an SSB occasion, and the value of a particular bit in the bitmap may indicate whether a CD-SSB is to be transmitted in the associated SSB occasion. As an example, a bitmap of 0101 may indicate that a CD-SSB is to be transmitted in the SSB occasions associated with SSB index 2 and SSB index 4.

In some aspects, the base station may transmit each CD-SSB in a CD-SSB transmission period on the same transmit beam, or may transmit one or more CD-SSBs in a CD-SSB transmission period a different transmit beam for purposes of spatial diversity. A UE may measure the CD-SSB transmissions to identify a beam with the highest signal strength and may initiate a random access channel (RACH) procedure using the identified beam to establish a connection with the base station.

As indicated above, FIGS. 3A and 3B are provided as examples. Other examples may differ from what is described with regard to FIGS. 3A and 3B.

Figure 4:
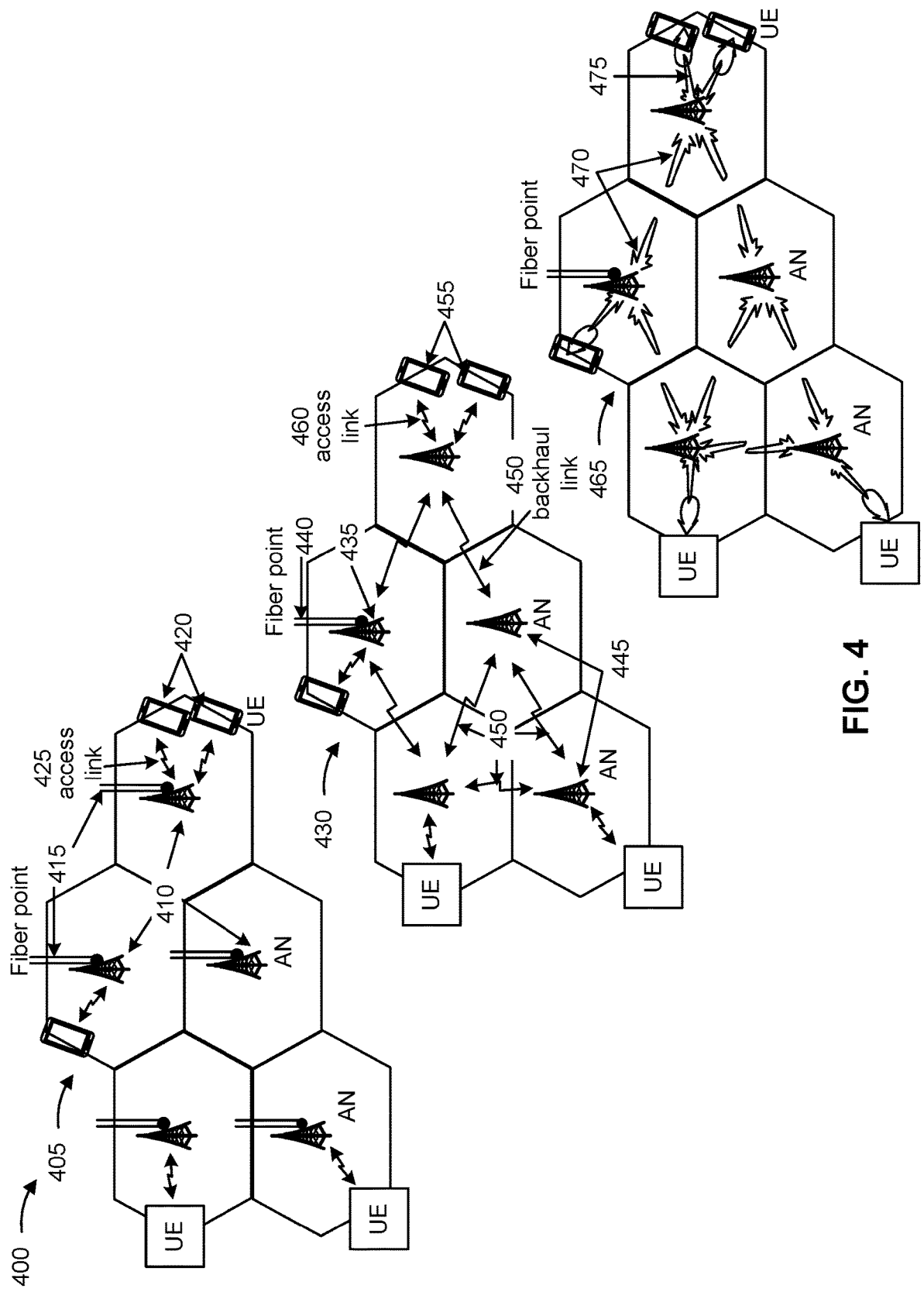
FIG. 4 is a diagram illustrating examples of radio access networks, in accordance with the present disclosure.

FIG. 4 is a diagram illustrating examples 400 of radio access networks, in accordance with the disclosure.

As shown by reference number 405, a traditional (e.g., 3G, 4G, LTE, and/or the like) radio access network may include multiple base stations 410 (e.g., access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may be a base station 110 shown in FIG. 1. In some aspects, a UE 420 shown in FIG. 4 may be a UE 120 shown in FIG. 1.

As shown by reference number 430, a radio access network may include a wireless backhaul network, sometimes referred to as an integrated access and backhaul (IAB) network. In an IAB network, at least one base station is an anchor base station 435 that communicates with a core network via a wired backhaul link 440, such as a fiber connection. An anchor base station 435 may also be referred to as an IAB donor (or IAB-donor). The IAB network may include one or more non-anchor base stations 445, sometimes referred to as relay base stations or IAB nodes (or IAB-nodes). The non-anchor base station 445 may communicate directly or indirectly with the anchor base station 435 via one or more backhaul links 450 (e.g., via one or more non-anchor base stations 445) to form a backhaul path to the core network for carrying backhaul traffic. Backhaul link 450 may be a wireless link. Anchor base station(s) 435 and/or non-anchor base station(s) 445 may communicate with one or more UEs 455 via access links 460, which may be wireless links for carrying access traffic. In some aspects, an anchor base station 435 and/or a non-anchor base station 445 shown in FIG. 4 may be a base station 110 shown in FIG. 1. In some aspects, a UE 455 shown in FIG. 4 may be a UE 120 shown in FIG. 1.

As shown by reference number 465, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 470 between base stations may use millimeter wave signals to carry information and/or may be directed toward a target base station using beamforming and/or the like. Similarly, the wireless access links 475 between a UE and a base station may use millimeter wave signals and/or may be directed toward a target wireless node (e.g., a UE and/or a base station). In this way, inter-link interference may be reduced.

The configuration of base stations and UEs in FIG. 4 is shown as an example, and other examples are contemplated. For example, one or more base stations illustrated in FIG. 4 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 4 is provided as an example. Other examples may differ from what is described with regard to FIG. 4.

Figure 5:
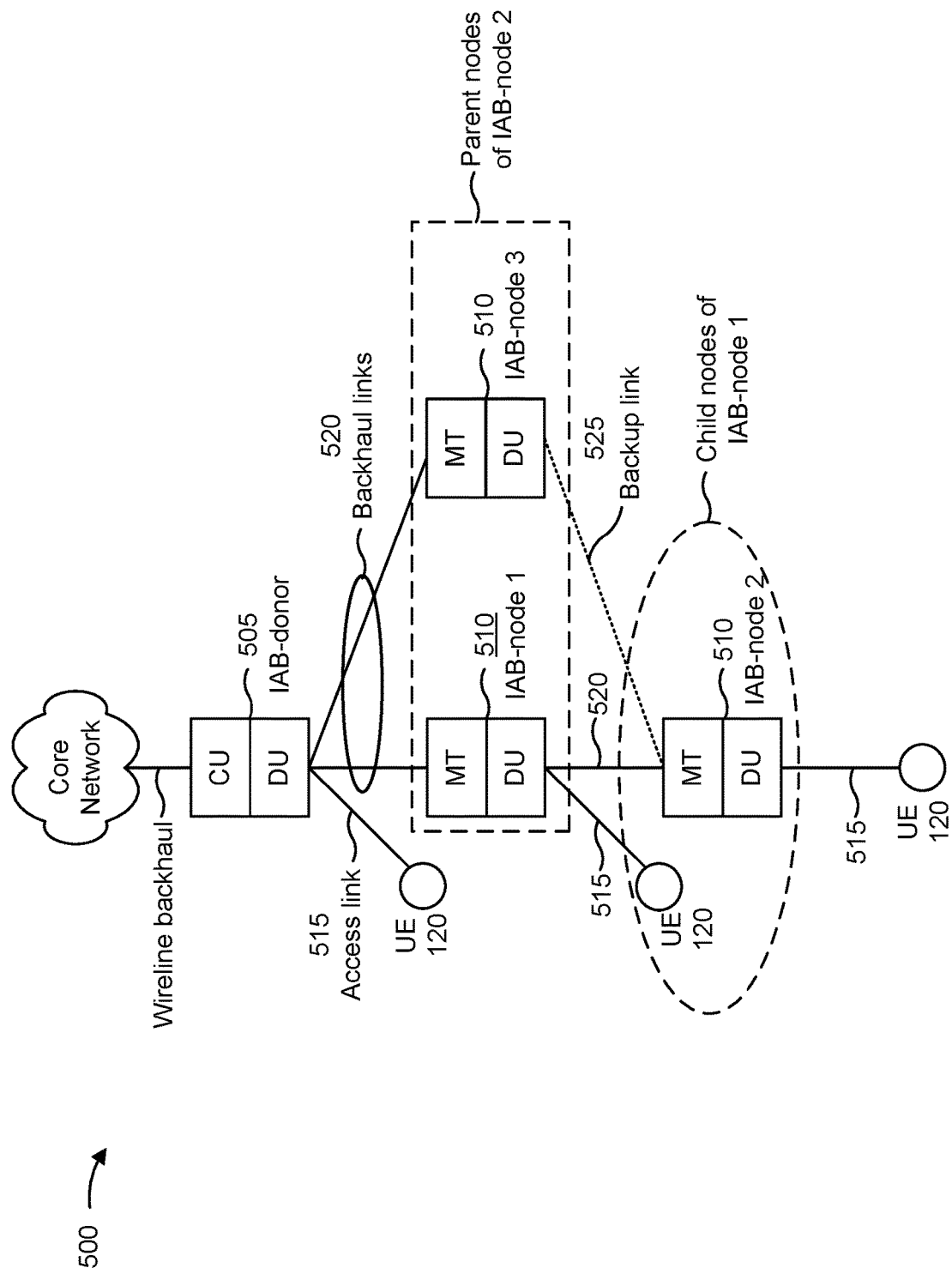
FIG. 5 is a diagram illustrating an example of an integrated access and backhaul (IAB) network architecture, in accordance with the present disclosure.

FIG. 5 is a diagram illustrating an example 500 of an IAB network architecture, in accordance with the disclosure.

As shown in FIG. 5, an IAB network may include an IAB donor 505 (shown as IAB-donor) that connects to a core network via a wired connection (shown as a wireline backhaul). For example, an Ng interface of an IAB donor 505 may terminate at a core network. Additionally, or alternatively, an IAB donor 505 may connect to one or more devices of the core network that provide a core access and mobility management function (e.g., AMF). In some aspects, an IAB donor 505 may include a base station 110, such as an anchor base station, as described above in connection with 4. As shown, an IAB donor 505 may include a central unit or control unit (CU), which may perform access node controller (ANC) functions, AMF functions, and/or the like. The CU may configure a distributed unit (DU) of the IAB donor 505 and/or may configure one or more IAB nodes 510 (e.g., an MT and/or a DU of an IAB node 510) that connect to the core network via the IAB donor 505. Thus, a CU of an IAB donor 505 may control and/or configure the entire IAB network that connects to the core network via the IAB donor 505, such as by using control messages and/or configuration messages (e.g., a radio resource control (RRC) configuration message, an F1 application protocol (FLAP) message, and/or the like).

As further shown in FIG. 5, the IAB network may include IAB nodes 510 (shown as IAB-node 1, IAB-node 2, and IAB-node 3) that connect to the core network via the IAB donor 505. As shown, an IAB node 510 may include mobile termination (MT) functions (also sometimes referred to as UE functions (UEF)) and may include DU functions (also sometimes referred to as access node functions (ANF)). The MT functions of an IAB node 510 (e.g., a child node) may be controlled and/or scheduled by another IAB node 510 (e.g., a parent node of the child node) and/or by an IAB donor 505. The DU functions of an IAB node 510 (e.g., a parent node) may control and/or schedule other IAB nodes 510 (e.g., child nodes of the parent node) and/or UEs 120. Thus, a DU may be referred to as a scheduling node or a scheduling component, and an MT may be referred to as a scheduled node or a scheduled component. In some aspects, an IAB donor 505 may include DU functions and not MT functions. That is, an IAB donor 505 may configure, control, and/or schedule communications of IAB nodes 510 and/or UEs 120. A UE 120 may include only MT functions, and not DU functions. That is, communications of a UE 120 may be controlled and/or scheduled by an IAB donor 505 and/or an IAB node 510 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 505 or an IAB node 510, and a child node may be an IAB node 510 or a UE 120. Communications of an MT function of a child node may be controlled and/or scheduled by a parent node of the child node.

As further shown in FIG. 5, a link between a UE 120 (e.g., which only has MT functions, and not DU functions) and an IAB donor 505, or between a UE 120 and an IAB node 510, may be referred to as an access link 515. Access link 515 may be a wireless access link that provides a UE 120 with radio access to a core network via an IAB donor 505, and optionally via one or more IAB nodes 510. Thus, the network illustrated in 5 may be referred to as a multi-hop network or a wireless multi-hop network.

As further shown in FIG. 5, a link between an IAB donor 505 and an IAB node 510 or between two IAB nodes 510 may be referred to as a backhaul link 520. Backhaul link 520 may be a wireless backhaul link that provides an IAB node 510 with radio access to a core network via an IAB donor 505, and optionally via one or more other IAB nodes 510. In an IAB network, network resources for wireless communications (e.g., time resources, frequency resources, spatial resources, and/or the like) may be shared between access links 515 and backhaul links 520. In some aspects, a backhaul link 520 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 525 between IAB-node 2 and IAB-node 3 may be used for backhaul communications if a primary backhaul link between IAB-node 2 and IAB-node 1 fails. As used herein, "node" or "wireless node" may refer to an IAB donor 505 or an IAB node 510.

As indicated above, FIG. 5 is provided as an example. Other examples may differ from what is described with regard to FIG. 5.

Figure 6:
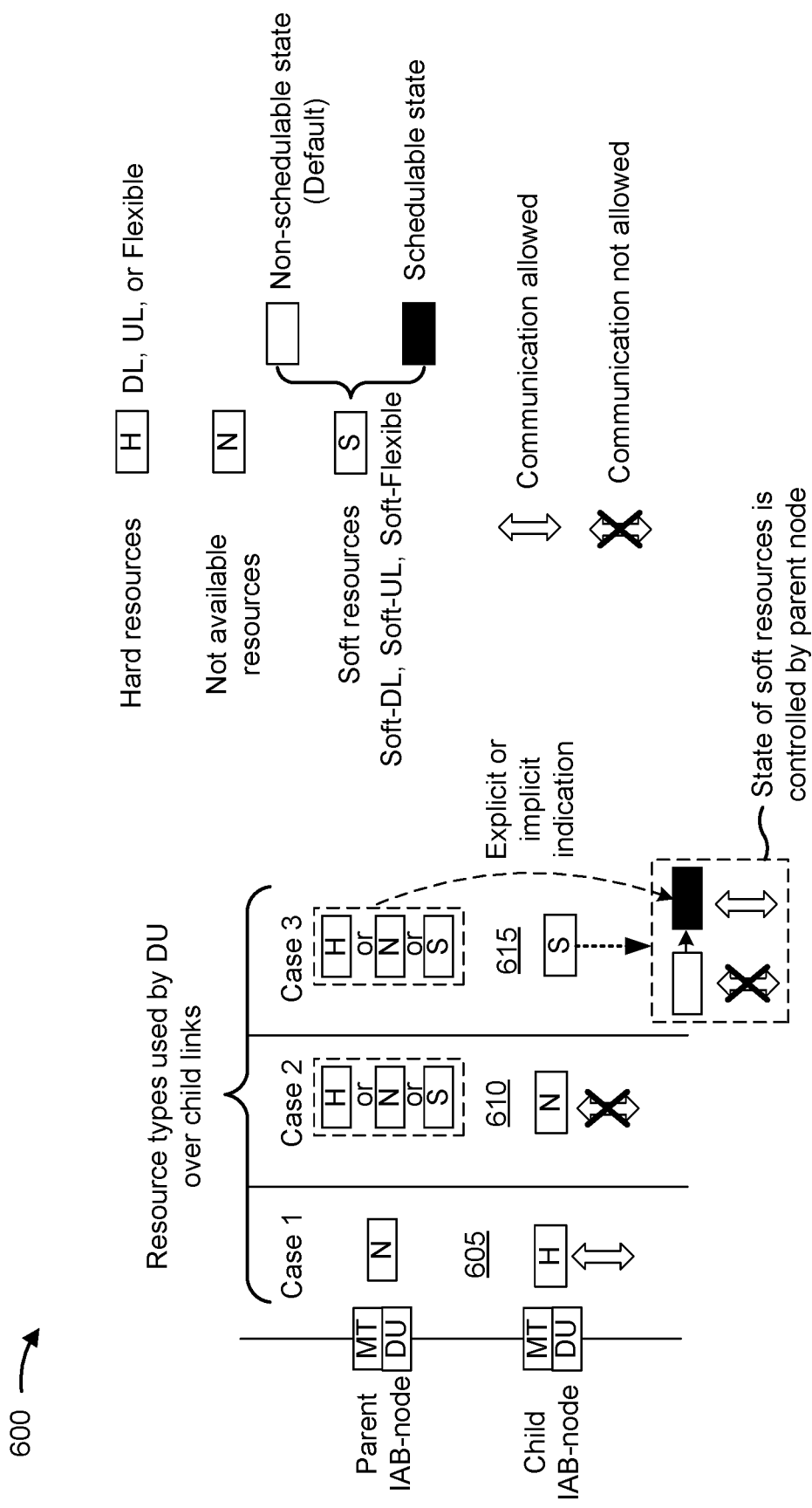
FIG. 6 is a diagram illustrating an example 600 of resource types in an IAB network, in accordance with the present disclosure.

FIG. 6 is a diagram illustrating an example 600 of resource types in an IAB network, in accordance with the disclosure.

In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, sounding reference signals (SRS), and/or the like.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) or a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 605, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 610, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 615, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 6 is provided as an example. Other examples are possible and may differ from what was described with regard to FIG. 6.

A base station DU may transmit CD-SSBs in a serving cell according to an example transmission timing, as described above in connection with FIG. 3B. Moreover, the base station DU may transmit other types of system information to a base station CU associated with the base station DU, such as one or more SIBs, a master information block (MIB), remaining minimum system information (RMSI), and/or the like. A MIB may include system information transmitted on a broadcast channel (e.g., a physical broadcast channel (PBCH)) at a particular periodicity (e.g., every 80 ms and/or the like), where repetitions of the MIB are scheduled according to the periodicity of the SSB in which the MIB is to be transmitted. The MIB may include information such as one or more parameters that are used to acquire a SIB 1 from the serving cell of the base station DU, may include the 6 most significant bits (MSBs) of a 10-bit system frame number for a radio frame in which the CD-SSBs are to be transmitted, and/or the like. The remaining 4 least significant bits (LSBs) of the 10-bit system frame number may be transmitted by the base station DU in a PBCH transport block as part of channel coding (e.g., outside of the MIB encoding).

While the base station CU may be capable of determining the radio frame in which the base station DU is to transmit the CD-SSBs in some cases, the base station CU may not know in which half radio frame within the radio frame the base station DU is to transmit the CD-SSBs. Moreover, due to periodicity of the CD-SSBs, in some cases, the base station CU may be unable to determine the radio frame in which the base station DU is to transmit the CD-SSBs. Without knowledge of this level of granularity for the transmission timing of the CD-SSBs, the base station CU may be unable to efficiently coordinate radio resources between the base station DU, other base station DUs, a base station MT associated with the base station DU, and/or the like. This may result in overlapping SSB transmission and SSB measurement for the base station DU and the associated base station MT. Moreover, this may result in a parent DU of the base station DU attempting to transmit to the base station DU while the base station DU is transmitting CD-SSBs, which may cause the signals from the parent DU to be received at the base station DU with very low power or to be un-receivable because of half-duplex constraints.

Some aspects described herein provide techniques and apparatuses for reporting an SSB configuration to a CU. In some aspects, a base station DU may configure and provide a report to a base station CU that identifies a transmission timing within a radio frame for transmission of one or more CD-SSBs in a serving cell of the base station DU. In this way, the base station CU may receive the report, may identify the transmission timing for the CD-SSBs, and may efficiently coordinate radio resource usage based at least in part on the transmission timing. For example, the base station CU may coordinate radio resource allocation between the base station DU and a parent DU on a per-serving cell basis to satisfy half-duplex constrains between the parent DU and the base station DU such that the base station DU is not scheduled to transmit CD-SSBs and receive from the parent DU simultaneously. As another example, the base station CU may coordinate SSB transmission and SSB measurement based at least in part on the transmission timing to repurpose CD-SSBs transmission for inter-node discovery and/or to avoid scheduling a base station DU to transmit CD-SSBs while an associated base station MT is performing inter-node discovery measurements.

Figure 7:
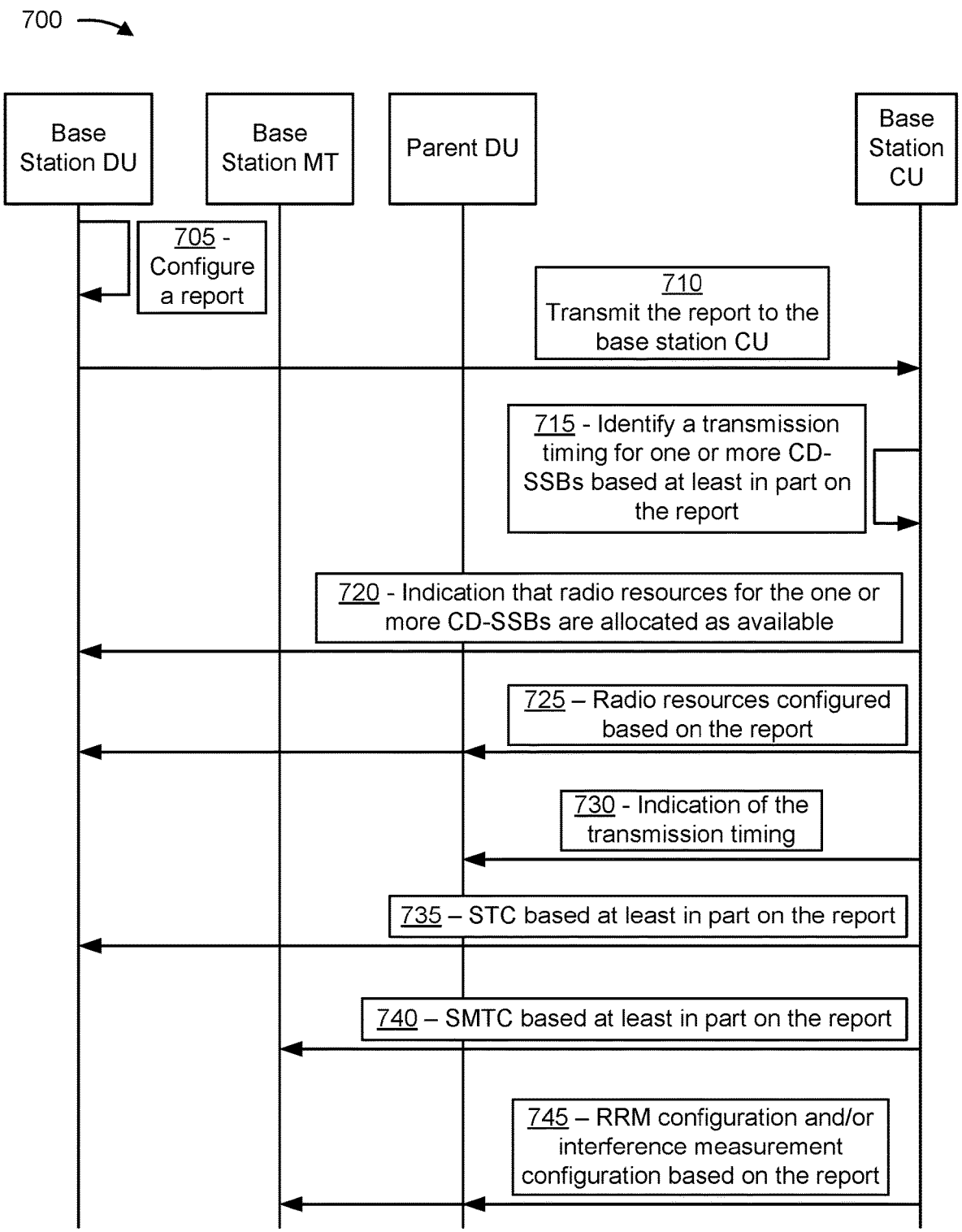
FIG. 7 is a diagram illustrating an example associated with reporting a synchronization signal block (SSB) configuration to a control unit, in accordance with the present disclosure.

FIG. 7 is a diagram illustrating an example 700 associated with reporting an SSB configuration to a CU, in accordance with the present disclosure. As shown in FIG. 7, example(s) 700 may include communication between a base station DU and a base station CU. In some aspects, example(s) 700 may further include communication between the base station CU and one or more base station MTs, one or more parent DUs associated with the base station DU, one or more child DUs associated with the base station DU, and/or the like.

In some aspects, the base station DU and the base station CU may each be associated with a base station 110 or a base station 410, and may be included in a wireless network (e.g., wireless network 100 or another wireless network). In some aspects, the base station DU and the base station CU may communicate on a backhaul link (e.g., a wireless backhaul, a wireline backhaul, and/or the like), such as a backhaul link 450, a backhaul link 470, a backhaul link 520, and/or the like.

In some aspects, the base station DU and the base station CU may be included in an IAB network. In some aspects, the base station DU and the base station CU are associated with the same base station and/or the same IAB donor (e.g., anchor base station 435, IAB donor 505, and/or the like) in the IAB network. In some aspects, the base station DU and the base station CU are associated with different base stations and/or different IAB nodes. For example, the base station CU may be associated with an IAB donor and the base station DU may be associated with a non-anchor base station 445 or an IAB node 510 (e.g., which may be an IAB parent node of another IAB node, may be a child node of another IAB node, and/or the like). In these cases, the IAB node associated with the base station DU may further be associated with a base station MT.

In some aspects, the base station DU may transmit CD-SSBs in a serving cell according to an example transmission timing, as described above in connection with FIG. 3B. As shown by reference number 705, the base station DU may configure (e.g., using transmit processor 220, receive processor 238, controller/processor 240, memory 242, configuration component 1008 of FIG. 10, and/or the like) a report that identifies the transmission timing. The report may identify the transmission timing at a half-frame granularity. For example, the report may identify a half radio frame, within a particular radio frame, in which the base station DU is to transmit one or more CD-SSBs in a serving cell of the base station DU. In some aspects, if the CD-SSB transmission periodicity for the one or more CD-SSBs is one radio frame (e.g., the one or more CD-SSBs are transmitted every radio frame), the report may indicate whether the one or more CD-SSBs are to be transmitted in the first half radio frame within the radio frame or in the second half radio frame within the radio frame.

In some aspects, if the CD-SSB transmission periodicity for the one or more CD-SSBs is a plurality of radio frames (e.g., the one or more CD-SSBs are transmitted once in a time duration of a plurality of radio frames), the report may indicate in which half radio frame within the CD-SSB transmission period the base station DU is to transmit the one or more CD-SSBs. In these cases, the base station DU may further configure (e.g., using transmit processor 220, receive processor 238, controller/processor 240, memory 242, configuration component 1008, and/or the like) the report to indicate a system frame number of the radio frame in which the half radio frame is included. The base station DU may configure (e.g., using transmit processor 220, receive processor 238, controller/processor 240, memory 242, configuration component 1008, and/or the like) the report to indicate all (e.g., 10 bits) of the system frame number, or may configure the report to indicate the 4 remaining LSBs for the system frame number. The base station CU may determine (e.g., using transmit processor 220, receive processor 238, controller/processor 240, memory 242, and/or the like) the system frame number based at least in part on the 4 remaining LSBs in the report and the 6 MSBs indicated in a MIB transmitted from the base station DU.

The half radio frame in which the base station DU is to transmit the one or more CD-SSBs may be indicated in the report by one bit or a plurality of bits (e.g., based at least in part on the CD-SSB transmission periodicity of the one or more CD-SSBs). In some aspects, if the one or more CD-SSBs are to be transmitted at a periodicity of every half radio frame (e.g., every 5 ms), no additional bits are needed in the report. In some aspects, if the one or more CD-SSBs are to be transmitted at a periodicity of every radio frame (e.g., every 10 ms), the half radio frame may be indicated by a single bit in the report. The value of the one bid may indicate whether the one or more CD-SSBs are to be transmitted in a first half radio frame or a second half radio frame of a radio frame. For example, a 0-value may indicate that the base station DU is to transmit the one or more CD-SSBs in the first half radio frame, whereas a 1-value may indicate that the base station DU is to transmit the one or more CD-SSBs in the second half radio frame. As another example, a 1-value may indicate that the base station DU is to transmit the one or more CD-SSBs in the first half radio frame, whereas a 0-value may indicate that the base station DU is to transmit the one or more CD-SSBs in the second half radio frame.

In some aspects, if the one or more CD-SSBs are to be transmitted at a periodicity of once every two radio frames (e.g., every 20 ms), the half radio frame may be indicated by two bits in the report. For example, a 00 value may be used to indicate the first half radio frame in the first radio frame, a 01 value may be used to indicate the second half radio frame in the first radio frame, a 10 value may be used to indicate the first half radio frame in the second radio frame, and a 11 value may be used to indicate the second half radio frame in the second radio frame. Other schemes for indicating a half radio frame within a two radio frame periodicity may be used.

In some aspects, if the one or more CD-SSBs are to be transmitted at a periodicity of greater than two radio frames, (e.g., up to 16 radio frames or 160 ms), more than two bits (e.g., up to five bits) may be used to indicate the half radio frame in which the base station DU is to transmit the one or more CD-SSBs.

Figure 10:
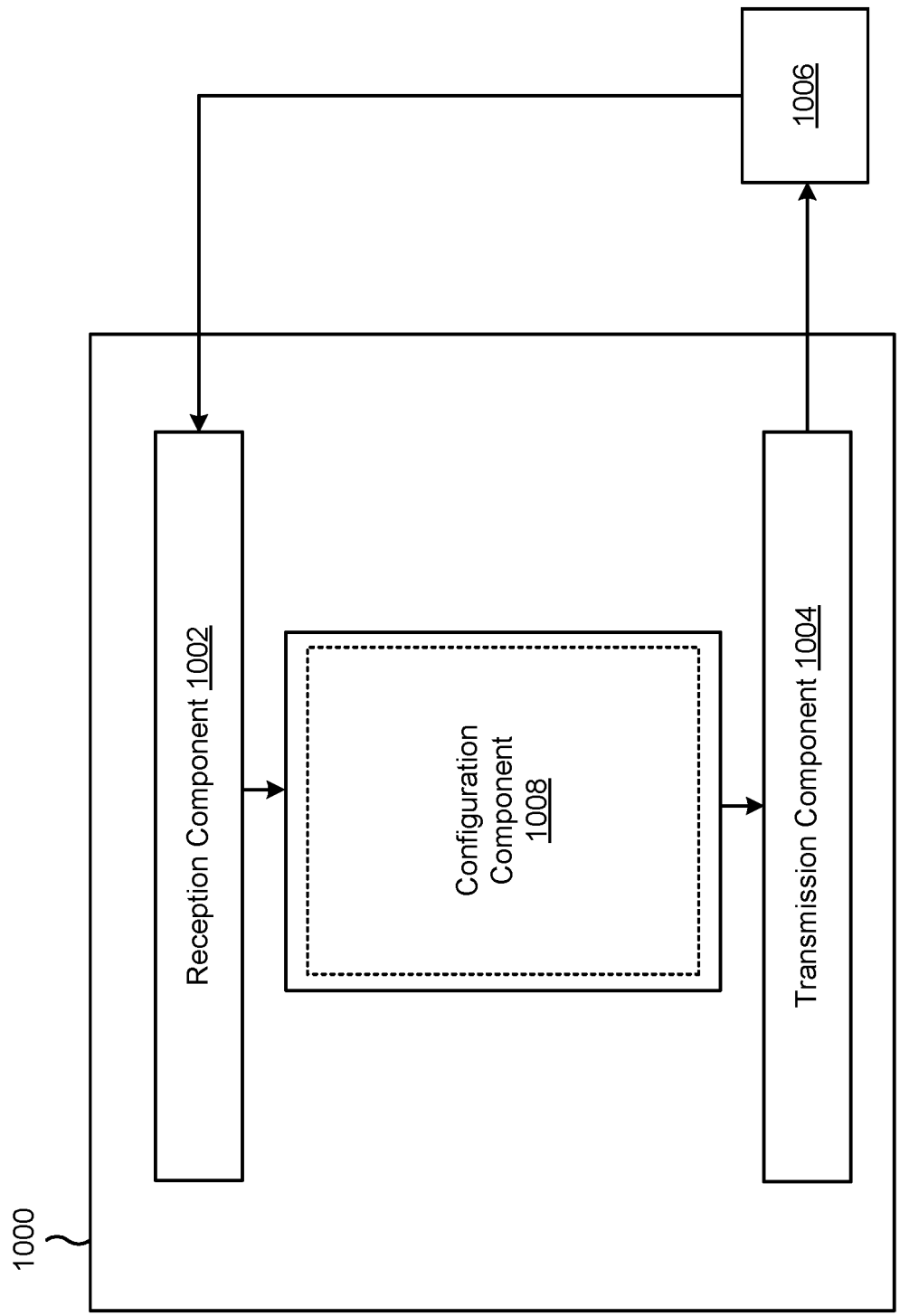
FIGS. 10-11 are block diagrams of example apparatuses for wireless communication, in accordance with the present disclosure.

As further shown in FIG. 7, and by reference number 710, the base station DU may transmit (e.g., using controller/processor 240, transmit processor 220, TX MIMO processor 230, MOD 232, antenna 234, memory 242, transmission component 1004 of FIG. 10, and/or the like) the report to the base station CU. In some aspects, the base station DU may transmit the report to the base station CU on a backhaul (e.g., a wireline backhaul, a wireless backhaul, a backhaul in an IAB network, and/or the like). In some aspects, the base station DU may transmit the report to the base station CU via a backhaul signaling interface. The backhaul signaling interface may include an F1 application protocol (F1-AP) interface or another type of backhaul signaling interface.

In some aspects, the report may be included in served-cell information associated with the serving cell of the base station DU, may be included in system information (e.g., SIB 1, RMSI, and/or the like) associated with the serving cell of the base station DU, and/or the like.

In some aspects, the base station DU may provide a plurality of serving cells. In these cases, the base station DU may configure and transmit reports for transmission timings of CD-SSBs in each of the plurality of serving cells to the base station CU. In some aspects, the base station DU may transmit the reports to other base station CUs.

Figure 11:
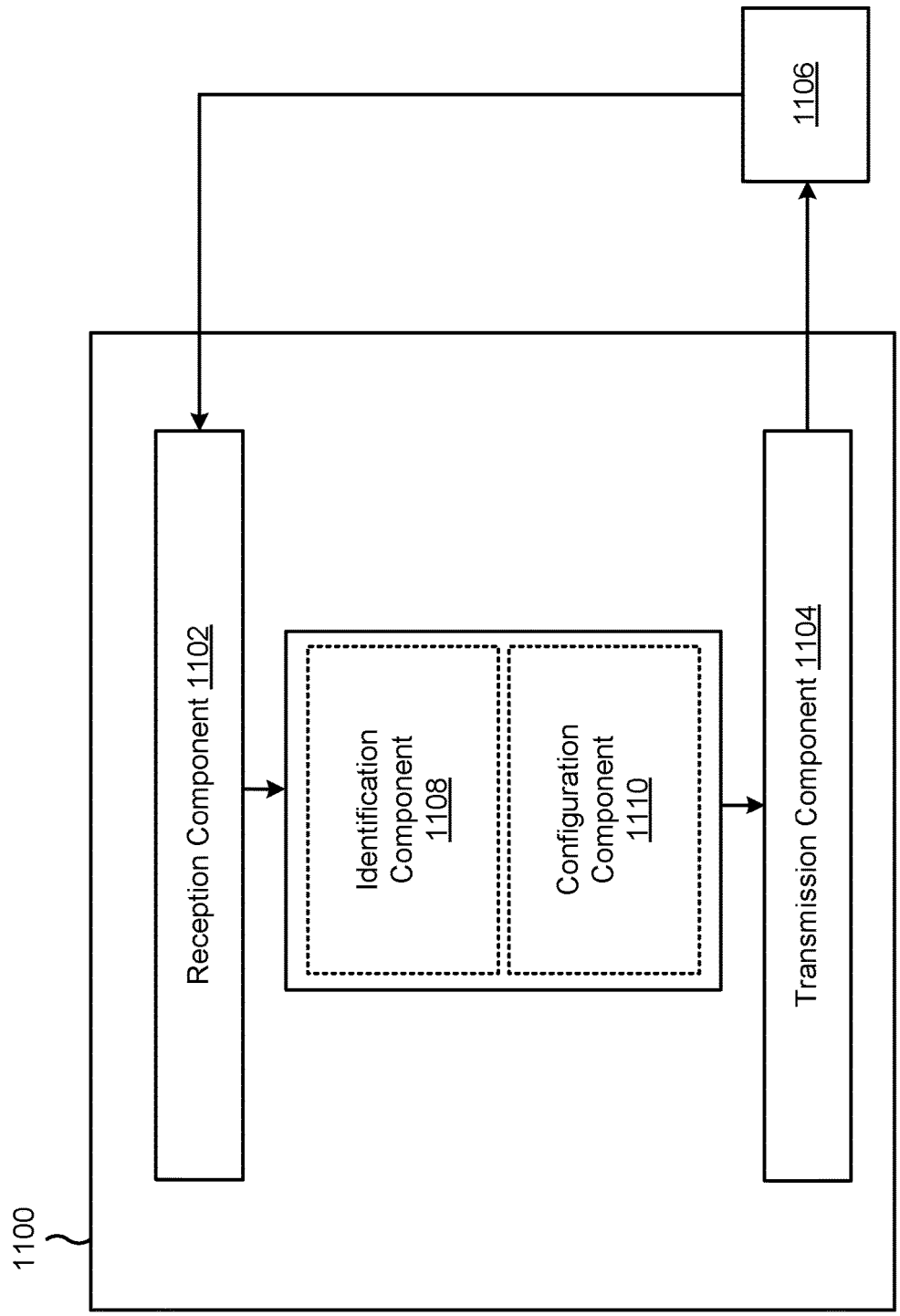

As further shown in FIG. 7, and by reference number 715, the base station CU may receive (e.g., using antenna 234, DEMOD 232, MIMO detector 236, receive processor 238, controller/processor 240, memory 242, reception component 1102 of FIG. 11, and/or the like) the report and may identify (e.g., using transmit processor 220, receive processor 238, controller/processor 240, memory 242, identification component 1108 of FIG. 11, and/or the like) the transmission timing for transmission of the one or more CD-SSBs based at least in part on the report. In particular, the base station CU may identify the transmission timing based at least in part on the half radio frame indicated in the report (e.g., within a particular radio frame). For example, the base station CU may identify the half radio frame based at least in part on the value(s) of one or more bits in the report indicating the half radio frame.

In some aspects, the base station CU may further identify (e.g., using transmit processor 220, receive processor 238, controller/processor 240, memory 242, identification component 1108, and/or the like) the radio frame in which the half radio frame is included and/or a periodicity for transmission of the one or more CD-SSBs. For example, the base station CU may identify the radio frame based at least in part on an indication of the 6 MSBs of the system frame number in the MIB transmitted from the base station DU, based at least in part on an indication of the 4 LSBs in the report, or a combination thereof. As another example, the base station CU may identify the radio frame based at least in part on an indication of the 10 bits of the system frame number in the report.

As another example, the base station CU may identify the periodicity for transmission of the one or more CD-SSBs based at least in part on a SIB 1 transmitted from the base station DU. In these cases, the base station CU may identify the periodicity based at least in part on an ssb-Periodicity-ServingCell information element included in the SIB 1. Moreover, the base station CU may identify (e.g., using transmit processor 220, receive processor 238, controller/processor 240, memory 242, identification component 1108, and/or the like) the SSB transmission pattern for the one or more CD-SSBs within the half radio frame. For example, the base station CU may identify the SSB indexes, within the half radio frame, in which the base station DU is to transmit the one or more CD-SSBs based at least in part on an ssb-PositionsInBurst information element included in the SIB 1 or in RRC signaling from the base station DU.

As further shown in FIG. 7, and by reference number 720, the base station CU may allocate the radio resources, in which transmission of the one or more CD-SSBs is to occur, as available for use by the base station DU. For example, the base station CU may identify (e.g., using transmit processor 220, receive processor 238, controller/processor 240, memory 242, identification component 1108, and/or the like) the radio resources (e.g., time-domain resources, such as one or more symbols, one or more slots, one or more subframes, one or more half radio frames, and/or the like) based at least in part on the transmission timing indicated in the report, and may transmit (e.g., using controller/processor 240, transmit processor 220, TX MIMO processor 230, MOD 232, antenna 234, memory 242, transmission component 1104 of FIG. 11, and/or the like) an indication that the radio resources are allocated as available to the base station DU. In some aspects, the base station CU allocates the radio resources as hard resources for the base station DU.

In this way, the base station DU may receive (e.g., using antenna 234, DEMOD 232, MIMO detector 236, receive processor 238, controller/processor 240, memory 242, reception component 1002 of FIG. 10, and/or the like) the indication that the radio resources are allocated to the base station DU as available and may use the radio resources to transmit the one or more CD-SSBs. This reduces and/or eliminates the likelihood that the base station DU will be scheduled to transmit the one or more CD-SSBs while being simultaneously scheduled to receive transmissions from the parent DU of the base station DU. In this way, the base station CU may configure per-cell resources for the base station DU such that half-duplex constrains of the base station DU may be satisfied.

As further shown in FIG. 7, and by reference number 725, the base station CU may attempt to coordinate and/or configure radio resources for the base station DU and/or for other base station DUs (e.g., parent DUs, child DUs, and/or the like) such that resource conflicts are minimized and/or avoided. For example, the base station CU may configure (e.g., using transmit processor 220, receive processor 238, controller/processor 240, memory 242, configuration component 1110 of FIG. 11, and/or the like) and transmit (e.g., using controller/processor 240, transmit processor 220, TX MIMO processor 230, MOD 232, antenna 234, memory 242, transmission component 1104, and/or the like) an indication that particular radio resources are configured for the base station DU or a parent DU of the base station DU to minimize or reduce overlapping transmissions with the one or more CD-SSBs. This minimizes and/or removes the need to apply conflict resolution rules among nodes in an IAB network, as the base station CU is aware of conflicts that occur among the communications of the nodes.

As further shown in FIG. 7, and by reference number 730, the base station CU may transmit (e.g., using controller/processor 240, transmit processor 220, TX MIMO processor 230, MOD 232, antenna 234, memory 242, transmission component 1104, and/or the like) an indication of the transmission timing to a parent node DU associated with the base station DU. The indication of the transmission timing may include a configuration of resources (e.g., periodicity) for the transmission of the one or more CD-SSBs, may include an indication of in which radio frame and/or which half radio frame the one or more CD-SSBs are to be transmitted, and/or the like. In some aspects, the base station CU may forward the report indicating the transmission timing to the parent node DU. In some aspects, the base station CU may configure a new report or communication based at least in part on the report, and may transmit the new report or communication to the parent node DU.

As further shown in FIG. 7, and by reference number 735, the base station CU may attempt to coordinate SSB transmission in an IAB network based at least in part on the transmission timing indicated in the report. For example, the base station CU may configure (e.g., using transmit processor 220, receive processor 238, controller/processor 240, memory 242, configuration component 1110 of FIG. 11, and/or the like) and transmit (e.g., using controller/processor 240, transmit processor 220, TX MIMO processor 230, MOD 232, antenna 234, memory 242, transmission component 1104, and/or the like) an SSB transmission configuration (STC) to the base station DU. The STC may be based at least in part on the report. The base station DU may transmit (e.g., using controller/processor 240, transmit processor 220, TX MIMO processor 230, MOD 232, antenna 234, memory 242, transmission component 1004, and/or the like) SSBs based at least in part on the STC.

An STC may be a configuration that enables the base station DU to determine when to transmit SSBs for the purpose of IAB inter-node discovery and measurements. The base station CU may transmit the STC to the base station DU on a backhaul link via an F1-AP signaling interface or another type of backhaul signaling interface. The STC may indicate time-domain resources that at least partially overlap with the transmission timing for the transmission of the one or more CD-SSBs. The base station CU may use the finer time granularity of the indication of the transmission timing in the report to more accurately configure the STC to use transmissions of the CD-SSBs. In this way, the CD-SSBs may be repurposed for other IAB nodes to measure for the purpose of IAB inter-node discovery and measurements.

In some aspects, the SSBs that are used for the STC may include all of the one or more CD-SSBs, may include a subset of the one or more SSBs, or may include a superset of the one or more CD-SSBs and other SSBs. In some aspects, the STC may further indicate an SSB center frequency, an SSB subcarrier spacing, a transmission periodicity, a transmission offset, one or more SSB indexes, and/or the like for transmission of SSBs for IAB inter-node discovery and measurements. In some aspects, the base station CU may configure a plurality of STCs for the base station DU.

As further shown in FIG. 7, and by reference number 740, the base station CU may attempt to coordinate SSB transmission measurement in an IAB network based at least in part on the transmission timing indicated in the report. For example, the base station CU may configure (e.g., using transmit processor 220, receive processor 238, controller/processor 240, memory 242, configuration component 1110 of FIG. 11, and/or the like) and transmit (e.g., using controller/processor 240, transmit processor 220, TX MIMO processor 230, MOD 232, antenna 234, memory 242, transmission component 1104, and/or the like) an SMTC to a base station MT associated with the base station DU. The SMTC may be based at least in part on the report. The base station MT may monitor and/or measure SSB transmissions from other base station DUs based at least in part on the SMTC.

An SMTC may be a configuration that enables the base station MT to determine when to monitor for and/or measure SSBs from other base station DUs for the purpose of IAB inter-node discovery and measurements. The base station CU may transmit the SMTC to the base station MT via RRC signaling. The SMTC may indicate time-domain resources that do not overlap with the transmission timing for the transmission of the one or more CD-SSBs of the associated base station DU. The base station CU may use the finer time granularity of the indication of the transmission timing in the report to more accurately configure the SMTC to avoid transmissions of the CD-SSBs. In this way, the base station MT avoids measuring the CD-SSBs of the associated base station DU, which may otherwise interfere with measurement of and discovery of neighboring base station DUs by causing the base station MT to discover the base station DU instead of the neighboring base station DUs.

In some aspects, the SMTC may further indicate an SSB center frequency, an SSB subcarrier spacing, a transmission periodicity, a transmission offset, one or more SSB indexes, and/or the like for the SSBs that the base station MT is to measure for IAB inter-node discovery. In some aspects, the base station CU may configure a plurality of SMTCs for the base station MT.

As further shown in FIG. 7, and by reference number 745, the base station CU may configure (e.g., using transmit processor 220, receive processor 238, controller/processor 240, memory 242, configuration component 1110 of FIG. 11, and/or the like) and transmit (e.g., using controller/processor 240, transmit processor 220, TX MIMO processor 230, MOD 232, antenna 234, memory 242, transmission component 1104, and/or the like) a radio resource management (RRM) configuration and/or an interference measurement configuration for the base station MT, the parent DU, another base station DU, a UE, and/or another node in the IAB network based at least in part on the transmission timing indicated in the report.

The RRM configuration and/or the interference measurement configuration may be configuration(s) that coordinate the measurement of interference of neighboring cells, that coordinate the measurement for purposes of detecting candidate cells for the purpose of handover, for purposes of radio resource measurement, and/or the like. In this way, the base station CU may configure a smaller, more efficient timing window in which the UE, the base station MT, and/or the like is to perform these measurements. This may result in the UE, the base station MT, and/or the like consuming fewer memory resources, processing resources, and/or battery resources in performing the measurements than if the UE, the base station MT, and/or the like were to blindly perform the measurements.

As indicated above, FIG. 7 is provided as an example. Other examples may differ from what is described with respect to FIG. 7.

Figure 8:
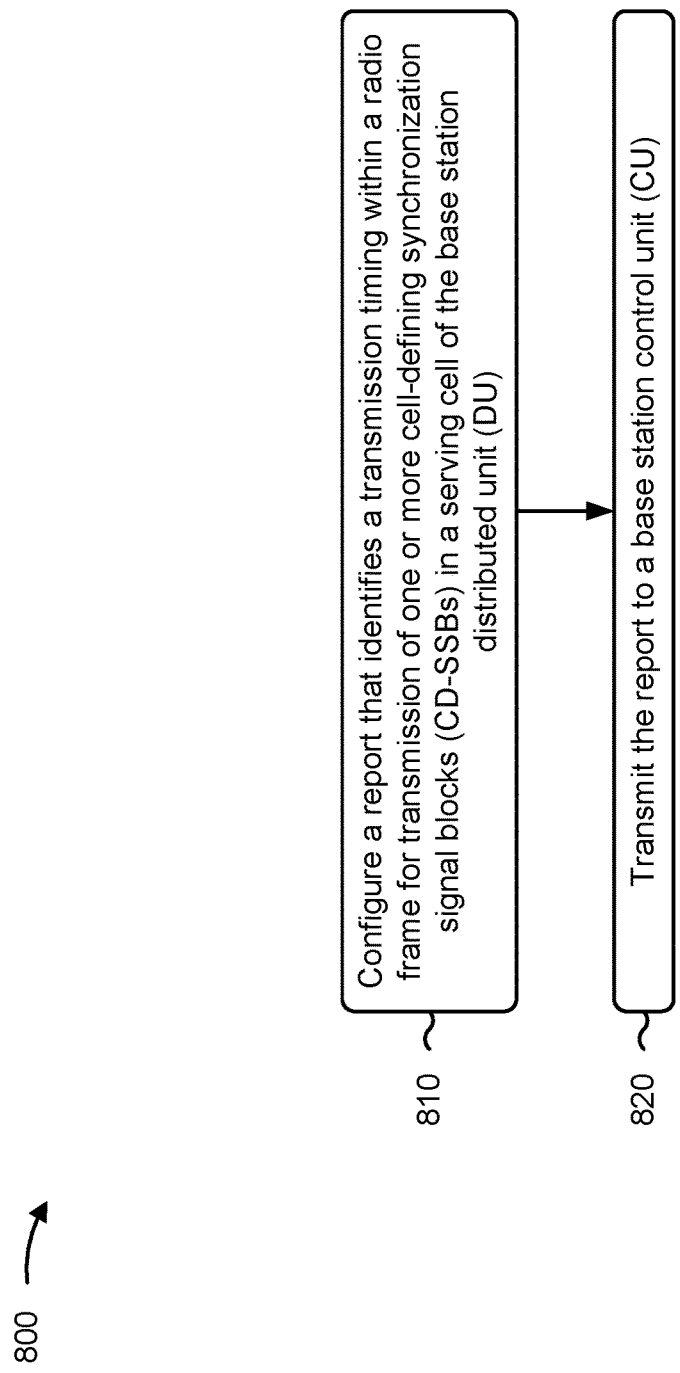
FIGS. 8 and 9 are diagrams illustrating example processes associated with reporting an SSB configuration to a control unit, in accordance with the present disclosure.

FIG. 8 is a diagram illustrating an example process 800 performed, for example, by a base station DU, in accordance with the present disclosure. Example process 800 is an example where the base station DU (e.g., a DU of base station 110, a DU of a base station 410, a DU of a non-anchor base station 445, a DU of IAB donor 505, a DU of IAB node 510, and/or the like) performs operations associated with reporting an SSB configuration to a CU.

As shown in FIG. 8, in some aspects, process 800 may include configuring a report that identifies a transmission timing within a radio frame for transmission of one or more CD-SSBs in a serving cell of the base station DU (block 810). For example, the base station DU (e.g., using transmit processor 220, receive processor 238, controller/processor 240, memory 242, configuration component 1008, and/or the like) may configure a report that identifies a transmission timing within a radio frame for transmission of one or more CD-SSBs in a serving cell of the base station DU, as described above in connection with FIG. 7.

As further shown in FIG. 8, in some aspects, process 800 may include transmitting the report to a base station CU (block 820). For example, the base station DU (e.g., using transmit processor 220, TX MIMO processor 230, modulator 232, antenna 234, controller/processor 240, memory 242, transmission component 1004, and/or the like) may transmit the report to a base station CU, as described above in connection with FIG. 7.

Process 800 may include additional aspects, such as any single aspect or any combination of aspects described below and/or in connection with one or more other processes described elsewhere herein.

In a first aspect, the report identifies a half radio frame, within the radio frame, in which the base station DU is to transmit the one or more CD-SSBs. In a second aspect, alone or in combination with the first aspect, the report identifies a half radio frame, within a period of one or more half radio frames, in which the base station DU is to transmit the one or more CD-SSBs. In a third aspect, alone or in combination with one or more of the first and second aspects, transmitting the report to the base station CU includes transmitting (e.g., using controller/processor 240, transmit processor 220, TX MIMO processor 230, MOD 232, antenna 234, memory 242, transmission component 1004, and/or the like) the report to the base station CU on an F1-AP signaling interface.

In a fourth aspect, alone or in combination with one or more of the first through third aspects, transmitting the report to the base station CU includes transmitting (e.g., using controller/processor 240, transmit processor 220, TX MIMO processor 230, MOD 232, antenna 234, memory 242, transmission component 1004, and/or the like) the report to the base station CU in served-cell information associated with the serving cell. In a fifth aspect, alone or in combination with one or more of the first through fourth aspects, transmitting the report to the base station CU includes transmitting (e.g., using controller/processor 240, transmit processor 220, TX MIMO processor 230, MOD 232, antenna 234, memory 242, transmission component 1004, and/or the like) the report to the base station CU in system information associated with the serving cell. In a sixth aspect, alone or in combination with one or more of the first through fifth aspects, the report includes a plurality of bits identifying a system frame number associated with the radio frame, and the transmission timing is indicated by another bit in the report.

In a seventh aspect, alone or in combination with one or more of the first through sixth aspects, the report includes a first subset of bits identifying a system frame number associated with the radio frame, a second subset of bits identifying the system frame number are included in a MIB associated with the serving cell, and the transmission timing is indicated by another bit in the report. In an eighth aspect, alone or in combination with one or more of the first through seventh aspects, the transmission timing is indicated in the report by one or more bits, and a quantity of the one or more bits is based at least in part on a transmission periodicity of the one or more CD-SSBs. In a ninth aspect, alone or in combination with one or more of the first through eighth aspects, the transmission periodicity includes one half radio frame that occurs every radio frame, and the half radio frame is identified by a single bit in the report.

In a tenth aspect, alone or in combination with one or more of the first through ninth aspects, the transmission periodicity includes one half radio frame that occurs at a period of a plurality of radio frames, and the half radio frame is identified by a plurality of bits in the report. In an eleventh aspect, alone or in combination with one or more of the first through tenth aspects, the base station DU includes an IAB donor DU or an IAB node DU, and the base station CU comprises an IAB donor CU.

In a twelfth aspect, alone or in combination with one or more of the first through eleventh aspects, process 800 includes receiving (e.g., using antenna 234, DEMOD 232, MIMO detector 236, receive processor 238, controller/processor 240, memory 242, reception component 1002, and/or the like), from the base station CU, an indication that radio resources for transmission of the one or more CD-SSBs in a serving cell of the base station DU are allocated as available for use by the base station DU. In a thirteenth aspect, alone or in combination with one or more of the first through twelfth aspects, process 800 includes receiving (e.g., using antenna 234, DEMOD 232, MIMO detector 236, receive processor 238, controller/processor 240, memory 242, reception component 1002, and/or the like), from the base station CU, an STC that is based at least in part on the report, wherein the STC indicates time-domain resources that at least partially overlap with the transmission timing for transmission of the one or more CD-SSBs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
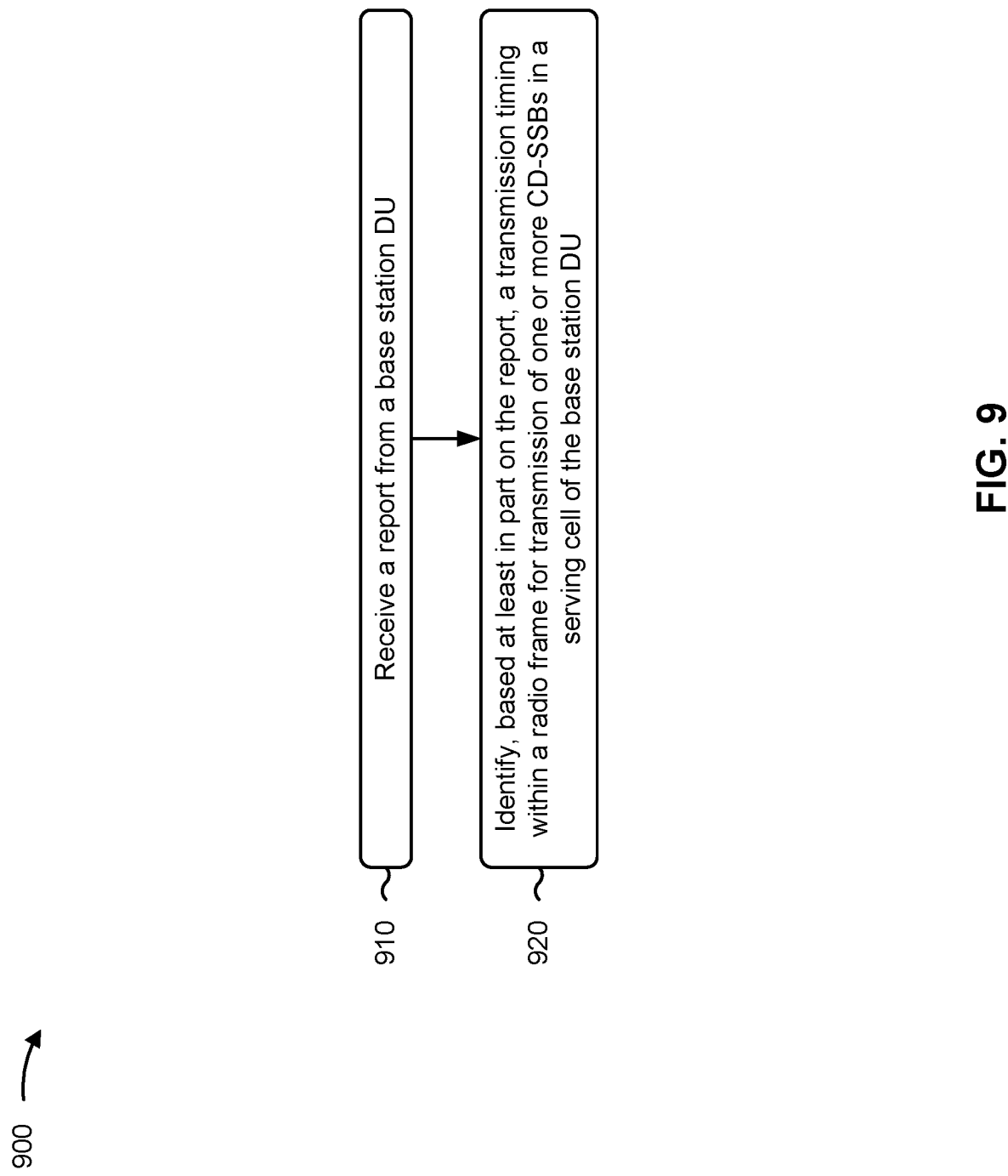

FIG. 9 is a diagram illustrating an example process 900 performed, for example, by a base station CU, in accordance with the present disclosure. Example process 900 is an example where the base station CU (e.g., a CU of a base station 110, a CU of a base station 410, a CU of an anchor base station 435, a CU of an IAB donor 505, and/or the like) performs operations associated with reporting an SSB configuration to a control unit.

As shown in FIG. 9, in some aspects, process 900 may include receiving a report from a base station DU (block 910). For example, the base station CU (e.g., using antenna 234, demodulator 232, MIMO detector 236, receive processor 238, controller/processor 240, memory 242, reception component 1102, and/or the like) may receive a report from a base station DU, as described above in connection with FIG. 7.

As further shown in FIG. 9, in some aspects, process 900 may include identifying, based at least in part on the report, a transmission timing within a radio frame for transmission of one or more CD-SSBs in a serving cell of the base station DU (block 920). For example, the base station CU (e.g., using transmit processor 220, receive processor 238, controller/processor 240, memory 242, identification component 1108, and/or the like) may identify, based at least in part on the report, a transmission timing within a radio frame for transmission of one or more CD-SSBs in a serving cell of the base station DU, as described above in connection with FIG. 7.

Process 900 may include additional aspects, such as any single aspect or any combination of aspects described below and/or in connection with one or more other processes described elsewhere herein.

In a first aspect, the report identifies a half radio frame, within the radio frame, in which the base station DU is to transmit the one or more CD-SSBs. In a second aspect, alone or in combination with the first aspect, the report identifies a half radio frame, within a period of one or more half radio frames, in which the base station DU is to transmit the one or more CD-SSBs. In a third aspect, alone or in combination with one or more of the first and second aspects, receiving the report comprises receiving (e.g., using antenna 234, DEMOD 232, MIMO detector 236, receive processor 238, controller/processor 240, memory 242, reception component 1102, and/or the like) the report from the base station DU on an F1-AP signaling interface. In a fourth aspect, alone or in combination with one or more of the first through third aspects, receiving the report comprises receiving (e.g., using antenna 234, DEMOD 232, MIMO detector 236, receive processor 238, controller/processor 240, memory 242, reception component 1102, and/or the like) the report from the base station DU in served-cell information associated with the serving cell.

In a fifth aspect, alone or in combination with one or more of the first through fourth aspects, receiving the report includes receiving (e.g., using antenna 234, DEMOD 232, MIMO detector 236, receive processor 238, controller/processor 240, memory 242, reception component 1102, and/or the like) the report from the base station DU in system information associated with the serving cell. In a sixth aspect, alone or in combination with one or more of the first through fifth aspects, the report includes a plurality of bits identifying a system frame number associated with the radio frame, and the transmission timing is indicated by another bit in the report. In a seventh aspect, alone or in combination with one or more of the first through sixth aspects, the report includes a first subset of bits identifying a system frame number associated with the radio frame, a second subset of bits identifying the system frame number are included in a MIB associated with the serving cell, and the transmission timing is indicated by another bit in the report.

In an eighth aspect, alone or in combination with one or more of the first through seventh aspects, the transmission timing is indicated in the report by one or more bits, and a quantity of the one or more bits is based at least in part on a transmission periodicity of the one or more CD-SSBs. In a ninth aspect, alone or in combination with one or more of the first through eighth aspects, the transmission periodicity comprises one half radio frame that occurs every radio frame, and the half radio frame is identified by a single bit in the report. In a tenth aspect, alone or in combination with one or more of the first through ninth aspects, the transmission periodicity comprises one half radio frame that occurs at a period of a plurality of radio frames, and the half radio frame is identified by a plurality of bits in the report.

In an eleventh aspect, alone or in combination with one or more of the first through tenth aspects, the base station DU includes an IAB donor DU or an IAB node DU, and the base station CU includes an IAB donor CU. In a twelfth aspect, alone or in combination with one or more of the first through eleventh aspects, process 900 includes transmitting (e.g., using controller/processor 240, transmit processor 220, TX MIMO processor 230, MOD 232, antenna 234, memory 242, transmission component 1104, and/or the like), to the base station DU, an indication that radio resources for transmission of the one or more CD-SSBs in a serving cell of the base station DU are allocated as available for use by the base station DU.

In a thirteenth aspect, alone or in combination with one or more of the first through twelfth aspects, process 900 includes configuring (e.g., using transmit processor 220, receive processor 238, controller/processor 240, memory 242, configuration component 1110, and/or the like) radio resources for at least one of the base station DU, a parent DU associated with the base station DU, or a child node DU associated with the base station DU based at least in part on the transmission timing. In a fourteenth aspect, alone or in combination with one or more of the first through thirteenth aspects, process 900 includes transmitting (e.g., using controller/processor 240, transmit processor 220, TX MIMO processor 230, MOD 232, antenna 234, memory 242, transmission component 1104, and/or the like) an indication of the transmission timing to a parent node DU associated with the base station DU. In a fifteenth aspect, alone or in combination with one or more of the first through fourteenth aspects, process 900 includes configuring (e.g., using receive processor 258, transmit processor 264, controller/processor 280, memory 282, configuration component 1110, and/or the like) an SMTC for a base station MT, associated with the base station DU, such that transmission of the one or more CD-SSBs does not overlap in the time-domain with SSB measurement for IAB inter-node discovery.

In a sixteenth aspect, alone or in combination with one or more of the first through fifteenth aspects, process 900 includes transmitting (e.g., using controller/processor 240, transmit processor 220, TX MIMO processor 230, MOD 232, antenna 234, memory 242, transmission component 1104, and/or the like), to the base station DU, an STC that is based at least in part on the report, wherein the STC indicates time-domain resources that at least partially overlap with the transmission timing for transmission of the one or more CD-SSBs. In a seventeenth aspect, alone or in combination with one or more of the first through sixteenth aspects, process 900 includes configuring (e.g., using transmit processor 220, receive processor 238, controller/processor 240, memory 242, configuration component 1110, and/or the like) at least one of an RRM configuration or an interference measurement configuration for at least one of a UE, a base station MT, or another base station DU based at least in part on the transmission timing.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a block diagram of an example apparatus 1000 for wireless communication. The apparatus 1000 may be a base station DU (e.g., a DU of a base station 110, a DU of a base station 410, a DU of a non-anchor base station 445, a DU of an IAB donor 505, a DU of an IAB node 510, and/or the like), or a base station DU may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, a base station CU, or another wireless communication device) using the reception component 1002 and the transmission component 1004. As further shown, the apparatus 1000 may include a configuration component 1008.

In some aspects, the apparatus 1000 may be configured to perform one or more operations described herein in connection with FIG. 7. Additionally or alternatively, the apparatus 1000 may be configured to perform one or more processes described herein, such as process 800 of FIG. 8. In some aspects, the apparatus 1000 and/or one or more components shown in FIG. 10 may include one or more components of the base station 110 described above in connection with FIG. 2. Additionally, or alternatively, one or more components shown in FIG. 10 may be implemented within one or more components of the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas 234, a demodulator 232, a MIMO detector 236, a receive processor 238, a controller/processor 240, a memory 242, or a combination thereof, of the base station 110 described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas 234, a modulator 232, a transmit MIMO processor 230, a transmit processor 220, a controller/processor 240, a memory 242, or a combination thereof, of the base station 110 described above in connection with FIG. 2. In some aspects, the transmission component 1004 may be collocated with the reception component 1002 in a transceiver.

In some aspects, the configuration component 1008 may configure a report that identifies a transmission timing within a radio frame for transmission of one or more CD-SSBs in a serving cell of the apparatus 1000. In some aspects, the transmission component 1004 may transmit the report to the apparatus 1006. In some aspects, the reception component 1102 may receive, from the apparatus 1006, an indication that radio resources for transmission of the one or more CD-SSBs in a serving cell of the apparatus 1000 are allocated as available for use by the apparatus 1000. In some aspects, the reception component 1002 may receive, from the apparatus 1006, an STC that is based at least in part on the report. The STC may indicate time-domain resources that at least partially overlap with the transmission timing for transmission of the one or more CD-SSBs.

The configuration component 1008 may include a memory. In some aspects, the configuration component 1008 may include a transmit processor 220, a receive processor 238, a controller/processor 240, a memory 242, or a combination thereof, of the base station 110 described above in connection with FIG. 2. The configuration component 1008 may include one or more processors coupled to the memory, the memory and the one or more processors configured to configure a report that identifies a transmission timing within a radio frame for transmission of one or more CD-SSBs in a serving cell of the apparatus 1000.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

FIG. 11 is a block diagram of an example apparatus 1100 for wireless communication. The apparatus 1100 may be a base station CU (e.g., a CU of a base station 110, a CU of a base station 410, a CU of an anchor base station 435, a CU of an IAB donor 505, and/or the like). In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a base station DU, a base station MT, or another wireless communication device) using the reception component 1102 and the transmission component 1104. As further shown, the apparatus 1100 may include one or more of an identification component 1108 and/or a configuration component 1110, among other examples.

In some aspects, the apparatus 1100 may be configured to perform one or more operations described herein in connection with FIG. 7. Additionally or alternatively, the apparatus 1100 may be configured to perform one or more processes described herein, such as process 900 of FIG. 9. In some aspects, the apparatus 1100 and/or one or more components shown in FIG. 11 may include one or more components of the base station 110 described above in connection with FIG. 2. Additionally, or alternatively, one or more components shown in FIG. 11 may be implemented within one or more components of the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas 234, a demodulator 232, a MIMO detector 236, a receive processor 238, a controller/processor 240, a memory 242, or a combination thereof, of the base station 110 described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas 234, a modulator 232, a transmit MIMO processor 230, a transmit processor 220, a controller/processor 240, a memory 242, or a combination thereof, of the base station 110 described above in connection with FIG. 2. In some aspects, the transmission component 1104 may be collocated with the reception component 1102 in a transceiver.

In some aspects, the reception component 1102 may receive a report from the apparatus 1106. In some aspects, the identification component 1108 may identify, based at least in part on the report, a transmission timing within a radio frame for transmission of one or more CD-SSBs in a serving cell of the apparatus 1106. In some aspects, the transmission component 1104 may transmit, to the apparatus 1106, an indication that radio resources for transmission of the one or more CD-SSBs in a serving cell of the apparatus 1106 are allocated as available for use by the apparatus 1106.

In some aspects, the configuration component 1110 may configure radio resources for the apparatus 1106 based at least in part on the transmission timing. In some aspects, the transmission component 1104 may transmit an indication of the transmission timing to a parent node DU associated with the apparatus 1006. In some aspects, the configuration component 1110 may configure an SMTC for a base station MT, associated with the apparatus 1106, such that transmission of the one or more CD-SSBs does not overlap in the time-domain with SSB measurement for IAB inter-node discovery. In some aspects, the transmission component 1104 may transmit, to the apparatus 1106, an STC that is based at least in part on the report. The STC may indicate time-domain resources that at least partially overlap with the transmission timing for transmission of the one or more CD-SSBs. In some aspects, the configuration component 1110 may configure at least one of an RRM configuration or an interference measurement configuration for at least one of a UE, a base station MT, or another apparatus 1106 based at least in part on the transmission timing.

The identification component 1108 may include a memory. In some aspects, the identification component 1108 may include a receive processor 238, a transmit processor 220, a controller/processor 240, a memory 242, or a combination thereof, of the base station 110 described above in connection with FIG. 2. The identification component 1108 may include one or more processors coupled to the memory, the memory and the one or more processors configured to identify, based at least in part on the report, a transmission timing within a radio frame for transmission of one or more CD-SSBs in a serving cell of the apparatus 1106.

The configuration component 1110 may include a memory. In some aspects, the configuration component 1110 may include a receive processor 238, a transmit processor 220, a controller/processor 240, a memory 242, or a combination thereof, of the base station 110 described above in connection with FIG. 2. The configuration component 1110 may include one or more processors coupled to the memory, the memory and the one or more processors configured to configure radio resources for the apparatus 1106 based at least in part on the transmission timing, to configure an SMTC for a base station MT, associated with the apparatus 1106, such that transmission of the one or more CD-SSBs does not overlap in the time-domain with SSB measurement for IAB inter-node discovery, to configure at least one of an RRM configuration or an interference measurement configuration for at least one of a UE, a base station MT, or another apparatus 1106 based at least in part on the transmission timing, and/or the like.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a base station distributed unit (DU), comprising: configuring a report that identifies a transmission timing within a radio frame for transmission of one or more cell-defining synchronization signal blocks (CD-SSBs) in a serving cell of the base station DU; and transmitting the report to a base station control unit (CU).

Aspect 2: The method of Aspect 1, wherein the report identifies a half radio frame, within the radio frame, in which the base station DU is to transmit the one or more CD-SSBs. Aspect 3: The method of Aspect 1 or 2, wherein the report identifies a half radio frame, within a period of one or more half radio frames, in which the base station DU is to transmit the one or more CD-SSBs. Aspect 4: The method of any of aspects Aspect 1-3, wherein transmitting the report to the base station CU comprises: transmitting the report to the base station CU on an F1 application protocol (F1-AP) signaling interface. Aspect 5: The method of any of aspects Aspect 1-4, wherein transmitting the report to the base station CU comprises: transmitting the report to the base station CU in served-cell information associated with the serving cell.

Aspect 6: The method of Aspect 1, wherein transmitting the report to the base station CU comprises: transmitting the report to the base station CU in system information associated with the serving cell. Aspect 7: The method of any of Aspects 1-6, wherein the report includes a plurality of bits identifying a system frame number associated with the radio frame; and wherein the transmission timing is indicated by another bit in the report. Aspect 8: The method of any of Aspects 1-7, wherein the report includes a first subset of bits identifying a system frame number associated with the radio frame; wherein a second subset of bits identifying the system frame number are included in a master information block (MIB) associated with the serving cell; and wherein the transmission timing is indicated by another bit in the report.

Aspect 9: The method of any of Aspects 1-8, wherein the transmission timing is indicated in the report by one or more bits; and wherein a quantity of the one or more bits is based at least in part on a transmission periodicity of the one or more CD-SSBs. Aspect 10: The method of Aspect 9, wherein the transmission periodicity comprises one half radio frame that occurs every radio frame; and wherein the half radio frame is identified by a single bit in the report. Aspect 11: The method of Aspect 9, wherein the transmission periodicity comprises one half radio frame that occurs at a period of a plurality of radio frames; and wherein the half radio frame is identified by a plurality of bits in the report.

Aspect 12: The method of any of Aspects 1-11, wherein the base station DU comprises an integrated access and backhaul (IAB) donor DU or an IAB node DU; and wherein the base station CU comprises an IAB donor CU. Aspect 13: The method of any of Aspects 1-12, further comprising: receiving, from the base station CU, an indication that radio resources for transmission of the one or more CD-SSBs in a serving cell of the base station DU are allocated as available for use by the base station DU. Aspect 14: The method of any of Aspects 1-13, further comprising: receiving, from the base station CU, a synchronization signal block timing configuration (STC) that is based at least in part on the report, wherein the STC indicates time-domain resources that at least partially overlap with the transmission timing for transmission of the one or more CD-SSBs.

Aspect 15: A method of wireless communication performed by a base station control unit (CU), comprising: receiving a report from a base station distributed unit (DU); and identifying, based at least in part on the report, a transmission timing within a radio frame for transmission of one or more cell-defining synchronization signal blocks (CD-SSBs) in a serving cell of the base station DU.

Aspect 16: The method of Aspect 15, wherein the report identifies a half radio frame, within the radio frame, in which the base station DU is to transmit the one or more CD-SSBs. Aspect 17: The method of Aspect 15 or 16, wherein the report identifies a half radio frame, within a period of one or more half radio frames, in which the base station DU is to transmit the one or more CD-SSBs. Aspect 18: The method of any of Aspects 15-17, wherein receiving the report comprises: receiving the report from the base station DU on an F1 application protocol (F1-AP) signaling interface.

Aspect 19: The method of any of Aspects 15-18, wherein receiving the report comprises: receiving the report from the base station DU in served-cell information associated with the serving cell. Aspect 20: The method of any of Aspects 15-19, wherein receiving the report comprises: receiving the report from the base station DU in system information associated with the serving cell. Aspect 21: The method of any of Aspects 15-20, wherein the report includes a plurality of bits identifying a system frame number associated with the radio frame; and wherein the transmission timing is indicated by another bit in the report.

Aspect 22: The method of any of Aspects 15-21, wherein the report includes a first subset of bits identifying a system frame number associated with the radio frame; wherein a second subset of bits identifying the system frame number are included in a master information block (MIB) associated with the serving cell; and wherein the transmission timing is indicated by another bit in the report. Aspect 23: The method of any of Aspects 15-22, wherein the transmission timing is indicated in the report by one or more bits; and wherein a quantity of the one or more bits is based at least in part on a transmission periodicity of the one or more CD-SSBs.

Aspect 24: The method of Aspect 23, wherein the transmission periodicity comprises one half radio frame that occurs every radio frame; and wherein the half radio frame is identified by a single bit in the report. Aspect 25: The method of Aspect 23, wherein the transmission periodicity comprises one half radio frame that occurs at a period of a plurality of radio frames; and wherein the half radio frame is identified by a plurality of bits in the report.

Aspect 26: The method of any of Aspects 15-25, wherein the base station DU comprises an integrated access and backhaul (IAB) donor DU or an IAB node DU; and wherein the base station CU comprises an IAB donor CU. Aspect 27: The method of any of Aspects 15-26, further comprising: transmitting, to the base station DU, an indication that radio resources for transmission of the one or more CD-SSBs in a serving cell of the base station DU are allocated as available for use by the base station DU.

Aspect 28: The method of any of Aspects 15-27, further comprising: configuring radio resources for at least one of the base station DU, a parent DU associated with the base station DU, or a child node DU associated with the base station DU based at least in part on the transmission timing. Aspect 29: The method of any of Aspects 15-28, further comprising: transmitting an indication of the transmission timing to a parent node DU associated with the base station DU. Aspect 30: The method of any of Aspects 15-29, further comprising: configuring a synchronization signal block (SSB) measurement timing configuration (SMTC) for a base station mobile terminal (MT), associated with the base station DU, such that transmission of the one or more CD-SSBs does not overlap in the time-domain with SSB measurement for integrated access and backhaul (TAB) inter-node discovery.

Aspect 31: The method of any of Aspects 15-30, further comprising: transmitting, to the base station DU, a synchronization signal block timing configuration (STC) that is based at least in part on the report, wherein the STC indicates time-domain resources that at least partially overlap with the transmission timing for transmission of the one or more CD-SSBs. Aspect 32: The method of any of Aspects 15-31, further comprising: configuring at least one of a radio resource management (RRM) configuration or an interference measurement configuration for at least one of a user equipment (UE), a base station mobile terminal (MT), or another base station DU based at least in part on the transmission timing.

Aspect 33: An apparatus for wireless communication at a device, comprising a processor; memory coupled with the processor; and instructions stored in the memory and executable by the processor to cause the apparatus to perform the method of one or more of Aspects 1-14. Aspect 34: A device for wireless communication, comprising a memory and one or more processors coupled to the memory, the one or more processors configured to perform the method of one or more of Aspects 1-14. Aspect 35: An apparatus for wireless communication, comprising at least one means for performing the method of one or more of Aspects 1-14.

Aspect 36: A non-transitory computer-readable medium storing code for wireless communication, the code comprising instructions executable by a processor to perform the method of one or more of Aspects 1-14. Aspect 37: A non-transitory computer-readable medium storing a set of instructions for wireless communication, the set of instructions comprising one or more instructions that, when executed by one or more processors of a device, cause the device to perform the method of one or more of Aspects 1-14.

Aspect 38: An apparatus for wireless communication at a device, comprising a processor; memory coupled with the processor; and instructions stored in the memory and executable by the processor to cause the apparatus to perform the method of one or more of Aspects 15-32. Aspect 39: A device for wireless communication, comprising a memory and one or more processors coupled to the memory, the one or more processors configured to perform the method of one or more of Aspects 15-32. Aspect 40: An apparatus for wireless communication, comprising at least one means for performing the method of one or more of Aspects 15-32.

Aspect 41: A non-transitory computer-readable medium storing code for wireless communication, the code comprising instructions executable by a processor to perform the method of one or more of Aspects 15-32. Aspect 42: A non-transitory computer-readable medium storing a set of instructions for wireless communication, the set of instructions comprising one or more instructions that, when executed by one or more processors of a device, cause the device to perform the method of one or more of Aspects 15-32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station distributed unit (DU), comprising:
   configuring a report for transmission to a base station control unit (CU) that identifies a transmission timing within a radio frame for transmission of one or more cell-defining synchronization signal blocks (CD-SSBs) in a serving cell of the base station DU;
   receiving, from the base station CU and in response to the report, an indication that radio resources for transmission of the one or more CD-SSBs in a serving cell of the base station DU are allocated as available for use by the base station DU; and
   receiving, from the base station CU, a timing configuration that is based at least in part on the transmission timing within the radio frame for transmission of the one or more CD-SSBs of the report.

2. The method of claim 1, wherein the report identifies a half radio frame, within the radio frame, in which the base station DU is to transmit the one or more CD-SSBs.

3. The method of claim 1, wherein the report identifies a half radio frame, within a period of one or more half radio frames, in which the base station DU is to transmit the one or more CD-SSBs.

4. The method of claim 1, wherein receiving the timing configuration comprises:
   receiving the timing configuration from the base station CU on a backhaul link via an F1 application protocol (F1-AP) signaling interface or another type of backhaul signaling interface.

5. The method of claim 1, further comprising:
   transmitting the report to the base station CU in served-cell information associated with the serving cell.

6. The method of claim 1, further comprising:
   transmitting the report to the base station CU in system information associated with the serving cell.

7. The method of claim 1, wherein the report includes a plurality of bits identifying a system frame number associated with the radio frame; and
   wherein the transmission timing is indicated by another bit in the report.

8. The method of claim 1, wherein the timing configuration indicates time-domain resources that at least partially overlap with the transmission timing for transmission of the one or more CD-SSBs.

9. A method of wireless communication performed by a base station control unit (CU), comprising:
   receiving a report from a base station distributed unit (DU) on a backhaul link;
   identifying, based at least in part on the report, a transmission timing within a radio frame for transmission of one or more cell-defining synchronization signal blocks (CD-SSBs) in a serving cell of the base station DU;
   transmitting, in response to the report, an indication to the base station DU that radio resources for transmission of the one or more CD-SSBs in a serving cell of the base station DU are allocated as available for use by the base station DU; and
   transmitting, to the base station DU, a timing configuration that is based at least in part on the transmission timing within the radio frame for transmission of the one or more CD-SSBs of the report, wherein the timing configuration indicates time-domain resources that at least partially overlap with the transmission timing for transmission of the one or more CD-SSBs in a serving cell of the base station DU.

10. The method of claim 9, wherein the report identifies a half radio frame, within the radio frame, in which the base station DU is to transmit the one or more CD-SSBs.

11. The method of claim 9, wherein the report identifies a half radio frame, within a period of one or more half radio frames, in which the base station DU is to transmit the one or more CD-SSBs.

12. The method of claim 9, wherein receiving the report comprises:
receiving the report from the base station DU on an F1 application protocol (F1-AP) signaling interface.

13. The method of claim 9, wherein receiving the report comprises:
receiving the report from the base station DU in served-cell information associated with the serving cell.

14. The method of claim 9, wherein receiving the report comprises:
receiving the report from the base station DU in system information associated with the serving cell.

15. The method of claim 9, wherein the report includes a plurality of bits identifying a system frame number associated with the radio frame; and
wherein the transmission timing is indicated by another bit in the report.

16. The method of claim 9, wherein the report includes a first subset of bits identifying a system frame number associated with the radio frame;
wherein a second subset of bits identifying the system frame number are included in a master information block (MIB) associated with the serving cell; and
wherein the transmission timing is indicated by another bit in the report.

17. The method of claim 9, further comprising:
configuring at least one of a radio resource management (RRM) configuration or an interference measurement configuration for at least one of a user equipment (UE), a base station mobile terminal (MT), or another base station DU based at least in part on the transmission timing.

18. A base station distributed unit (DU) for wireless communication, comprising:
one or more memories; and
one or more processors coupled to the one or more memories, the one or more processors configured to:
configure a report for transmission to a base station control unit (CU) that identifies a transmission timing within a radio frame for transmission of one or more cell-defining synchronization signal blocks (CD-SSBs) in a serving cell of the base station DU;
receive, from the base station CU and in response to the report, an indication that radio resources for transmission of the one or more CD-SSBs in a serving cell of the base station DU are allocated as available for use by the base station DU; and
receiving, from the base station CU, a timing configuration that is based at least in part on the transmission timing within the radio frame for transmission of the one or more CD-SSBs of the report.

19. The base station DU of claim 18, wherein the report includes a first subset of bits identifying a system frame number associated with the radio frame;
wherein a second subset of bits identifying the system frame number are included in a master information block (MIB) associated with the serving cell; and
wherein the transmission timing is indicated by another bit in the report.

20. The base station DU of claim 18, wherein the transmission timing is indicated in the report by one or more bits; and
wherein a quantity of the one or more bits is based at least in part on a transmission periodicity of the one or more CD-SSBs.

21. The base station DU of claim 20, wherein the transmission periodicity comprises one half radio frame that occurs every radio frame; and
wherein the half radio frame is identified by a single bit in the report.

22. The base station DU of claim 18, wherein the timing configuration comprises a synchronization signal block timing configuration (STC) that is based at least in part on the report, the STC indicating time-domain resources that at least partially overlap with the transmission timing for transmission of the one or more CD-SSBs.

23. A base station control unit (CU) for wireless communication, comprising:
one or more memories; and
one or more processors coupled to the one or more memories, the one or more processors configured to:
receive a report from a base station distributed unit (DU) on a backhaul link;
identify, based at least in part on the report, a transmission timing within a radio frame for transmission of one or more cell-defining synchronization signal blocks (CD-SSBs) in a serving cell of the base station DU;
transmitting, in response to the report, an indication to the base station DU that radio resources for transmission of the one or more CD-SSBs in a serving cell of the base station DU are allocated as available for use by the base station DU; and
transmit, to the base station DU, a timing configuration that is based at least in part on the transmission timing within the radio frame for transmission of the one or more CD-SSBs of the report, wherein the timing configuration indicates time-domain resources that at least partially overlap with the transmission timing for transmission of the one or more CD-SSBs in a serving cell of the base station DU.

24. The base station CU of claim 23, wherein the transmission timing is indicated in the report by one or more bits; and
wherein a quantity of the one or more bits is based at least in part on a transmission periodicity of the one or more CD-SSBs.

25. The base station CU of claim 24, wherein the transmission periodicity comprises one half radio frame that occurs at a period of a plurality of radio frames; and
wherein the half radio frame is identified by a plurality of bits in the report.

26. The base station CU of claim 23, wherein the one or more processors are further configured to:
configure radio resources for at least one of the base station DU, a parent DU associated with the base station DU, or a child node DU associated with the base station DU based at least in part on the transmission timing.

27. The base station CU of claim 23, wherein the one or more processors are further configured to:
transmit an indication of the transmission timing to a parent node DU associated with the base station DU.

28. The base station CU of claim 23, wherein the one or more processors are further configured to:
configure a synchronization signal block (SSB) measurement timing configuration (SMTC) for a base station mobile terminal (MT), associated with the base station DU, such that transmission of the one or more CD- SSBs does not overlap in the time-domain with SSB measurement for integrated access and backhaul (IAB) inter-node discovery.

29. The base station CU of claim 23, wherein the timing configuration comprises a synchronization signal block timing configuration (STC) that is based at least in part on the report, the STC indicating time-domain resources that at least partially overlap with the transmission timing for transmission of the one or more CD-SSBs.

30. The base station CU of claim 23, wherein the one or more processors are further configured to:
   configure at least one of a radio resource management (RRM) configuration or an interference measurement configuration for at least one of a user equipment (UE), a base station mobile terminal (MT), or another base station DU based at least in part on the transmission timing.

* * * * *